United States Patent [19]

Taylor et al.

[11] Patent Number: 5,228,978
[45] Date of Patent: Jul. 20, 1993

[54] MEANS FOR AND METHODS OF LOW SULFUR AND HYDROTREATED RESIDS AS INPUT FEEDSTREAMS

[75] Inventors: James L. Taylor, Naperville; William I. Beaton, Wheaton, both of Ill.; Jeffrey J. Kolstad, Wayzata, Minn.

[73] Assignee: Amoco Corporation, Chicago, Ill.

[21] Appl. No.: 824,508

[22] Filed: Jan. 23, 1992

Related U.S. Application Data

[63] Continuation-in-part of Ser. No. 616,208, Nov. 20, 1990, Pat. No. 5,124,026, and a continuation-in-part of Ser. No. 616,218, Nov. 20, 1990, Pat. No. 5,124,027, and a continuation-in-part of Ser. No. 616,219, Nov. 20, 1990, Pat. No. 5,124,025, which is a continuation-in-part of Ser. No. 381,372, Jul. 18, 1989, Pat. No. 5,013,427.

[51] Int. Cl.[5] .............................................. C10G 1/00
[52] U.S. Cl. ........................................ 208/89; 208/50; 208/52 R; 208/52 CT; 208/86; 208/92; 208/94; 208/49; 208/96; 208/97; 208/251 H; 208/216 R; 208/254 H

[58] Field of Search .................... 268/86, 89, 87, 92, 268/96

[56] References Cited

U.S. PATENT DOCUMENTS

| | | | |
|---|---|---|---|
| 4,686,027 | 8/1987 | Bonilla et al. | 208/87 |
| 4,940,529 | 7/1990 | Beaton et al. | 208/87 |
| 5,013,427 | 5/1991 | Mosby et al. | 208/87 |
| 5,089,114 | 2/1992 | Tovar | 208/87 |

Primary Examiner—Helane Myers
Attorney, Agent, or Firm—Scott P. McDonald; Richard A. Kretchmer; Frank J. Sroka

[57] ABSTRACT

The inventive solvent extraction process uses hydrotreated (HTR) and low sulfur (LSR) resids feedstreams in a single deasphalter unit and in a way that optimizes the disposition of the oils, resins, and asphaltene fractions of each resid for downstream processing. After the refractory asphaltenes are separated from the HTR feedstream, the LSR resid is introduced into the deasphalter so that its resin and asphaltene fractions are combined with the HTR resins. The oils fractions from the two resids are combined and then used as a feedstock for catalytic cracking.

19 Claims, 8 Drawing Sheets

MEANS FOR AND METHODS OF LOW SULFUR AND HYDROTREATED RESIDS AS INPUT FEEDSTREAMS

This is a continuation-in-part of Ser. Nos. 07/616,208, U.S. Pat. No. 5,124,026, 07/616,218, U.S. Pat. No. 5,124,027 and 07/616,219, U.S. Pat. No. 5,124,025 each of which was filed Nov. 20, 1990; each of which, in turn, was a continuation-in-part of Ser. No. 07/381,372 filed Jul. 18, 1989, now U.S. Pat. No. 5,013,427 issued May 7, 1991.

This invention relates to resid refineries and more particularly to such refineries having two feeds, one of virgin low sulfur resid and one of hydrotreated resid.

Much of the system disclosed herein is taken from U.S. Pat. No. 5,013,427, which may be consulted for further information. To help the reader, the same reference numerals are used both herein and in U.S. Pat. No. 5,013,427. A companion patent is U.S. Pat. No. 4,940,529.

REFERENCE TO PRIOR ART

Over the years, a variety of processes and equipment have been suggested for use in various refining operations, such as for upgrading oil, hydrotreating, reducing the formation of carbonaceous solids during hydrotreating. Typifying some of these prior art processes and equipment are those described in U.S. Pat. Nos. 2,382,282; 2,398,739; 2,398,759; 2,414,002; 2,425,849; 2,436,927; 2,692,222; 2,884,303; 2,900,308; 2,981,676; 2,985,584; 3,004,926; 3,039,953; 3,168,459; 3,338,818; 3,351,548; 3,364,136; 3,513,087; 3,563,911; 3,661,800; 3,766,055; 3,798,157; 3,838,036; 3,844,973; 3,905,892; 3,909,392; 3,923,636; 4,191,636; 4,239,616; 4,290,880; 4,305,814; 4,331,533; 4,332,674; 4,341,623; 4,341,660; 4,354,922; 4,400,264; 4,454,023; 4,486,295; 4,478,705; 4,495,060; 4,502,944; 4,521,295; 4,526,676; 4,592,827; 4,606,809; 4,617,175; 4,618,412; 4,622,210; 4,640,762; 4,655,903; 4,661,265; 4,662,669; 4,692,318; 4,695,370; 4,673,485; 4,681,674; 4,686,028; 4,720,337; 4,743,356; 4,753,721; 4,767,521; 4,769,127; 4,773,986; 4,808,289; and 4,818,371.

In these and other refining systems, the low sulfur resid gives many problems because although it may be further refined in a catalytic reaction, many of the components accompanying the low sulfur resid (LSR) may be difficult to crack. Thus, it is highly desirable to separate these troublesome components from the low sulfur resid so that it may be further refined. In some instances, the invention raises the useful yield from a feedstream from about 70% to nearly 100 vol. %.

DEFINITIONS

The term "asphaltenes" as use herein means a heavy polar fraction and are the residue which remains after the resins and oils have been separated from resid in a deasphalting unit. Asphaltenes from vacuum resid are generally characterized as follows: a Conradson or Ramsbottom carbon residue of 30 to 90 weight % and a hydrogen to carbon (H/C) atomic ratio of 0.5% to less than 1.2%. Asphaltenes can contain from 50 ppm to 5000 ppm vanadium and from 20 ppm to 2000 ppm nickel. The sulfur concentration of asphaltenes can be from 110% to 250% greater than the concentration of sulfur in the resid feed oil to the deasphalter. The nitrogen concentration of asphaltenes can be from 100% to 350% greater than the concentration of nitrogen in the resid feed oil to the deasphalter.

The term "resins" as used herein means resins that are denser or heavier than the deasphalted oil and comprise more aromatic hydrocarbons with highly substituted aliphatic side chains. Resins also comprise metals, such as nickel and vanadium, and comprise more heteroatoms than deasphalted oil. Resins from vacuum resid can be generally characterized as follows: a Conradson or Ramsbottom carbon residue of 10 to less than 30 weight % and a hydrogen to carbon (H/C) atomic ratio of 1.2% to less than 1.5%. Resins can contain 1000 ppm or less of vanadium and 300 ppm or less of nickel. The sulfur concentration in resins can be from 50% to 200% of the contraction of sulfur in the resid oil feed to the deasphalter. The nitrogen concentration in resins can be from 30% to 250% of the concentration of nitrogen in the resid oil feed in the deasphalter.

The term "low sulfur resid" ("LSR") as used herein means a virgin resid comprising less than 2% by weight sulfur. Virgin resid as used herein means a resid which has not been processed previously. Resid containing sulfur, other than low sulfur resid, is sometimes characterized as "high sulfur resid" (HSR).

The term "solvent-extracted oil" ("SEO") as used herein means substantially deasphalted, deresined (resin-free) oil which has been separated and obtained from a solvent extraction unit.

The terms "resid oil" and "resid" as used herein mean residual oil.

As used herein, the terms "deasphalting unit" and "deasphalter" mean one or more vessels or other equipment which are used to separate oil, resins, and asphaltenes.

The term "solvent extraction unit" ("SEU") as used herein means a deasphalter in which resid is separated into oil, resins, and asphaltenes by means of one or more solvents.

The term "deasphalted oil" as used herein means oils that are generally the lightest or least dense products produced in a deasphalting unit and comprise saturate aliphatic, alicyclic, and some aromatic hydrocarbons. Deasphalted oil generally comprises less than 30% aromatic carbon and low levels of heteroatoms except sulphur. Deasphalted oil from vacuum resid can be generally characterized as follows: a Conradson or Ramsbottom carbon residue of 1 to less than 12 weight % and a hydrogen to carbon (H/C) ratio of 1.5% to 2%. Deasphalted oil can contain 50 ppm or less, preferably less than 5 ppm, and most preferably less than 2 ppm, of vanadium and 50 ppm or less, preferably less than 5 ppm, and most preferably less than 2 ppm of nickel. The sulfur and nitrogen concentrations of deasphalted oil can be 90% or less of the sulfur an nitrogen concentrations of the resid feed oil to the deasphalter.

Decanted oil ("DCO") is a valuable solvent and is used in the resid hydrotreating unit for controlling the formation of carbonaceous solids therein. However, decanted oil is normally obtained from a catalytic cracking unit and contains cracking catalyst solids or fines therein. These fines are small particles made up of the catalyst used in the catalytic cracking unit.

The term "fine-lean DCO", or "fine-free DCO" as used herein, means decanted oil having less than 20 ppm silica and less than 20 ppm alumina.

Vacuum-reduced crude is also referred to as "resid", "resid oil", and "virgin unhydrotreated resid". This crude is pumped through a high sulfur resid feed line and into a resid hydrotreating unit ("RHU").

BACKGROUND OF THE INVENTION

It is desirable to provide an effective process to increase the yield of gasoline (naphtha) in catalytic cracking units. More particularly, catalytic cracking of oil is an important resid hydrotreating unit process which is used to produce gasoline and other hydrocarbons. In order to produce more valuable, lower molecular weight hydrocarbons during catalytic cracking, a feedstock, which is generally a cut or fraction of crude oil, is cracked in a reactor under catalytic cracking temperatures and pressures while in the presence of a catalyst. Gas oil which is usually used as a feedstock in catalytic cracking typically contain from 55% to 80% gas oil by volume, having a boiling range from 650° F. to 1000° F. and less than 1% Ramscarbon by weight. Gas oil feedstocks usually contain less than 5% by volume naphtha and lighter hydrocarbons having a boiling temperature below 430° F., from 10% to 30% by volume diesel and kerosene having a boiling range from 430° F. to 650° F., and less than 10% by volume resid having a boiling temperature above 1000° F.

Known processes catalytically crack virgin unhydrotreated, low sulfur resid as well as deasphalt, subsequently hydrotreat, and catalytically crack high sulfur resid. Furthermore, such prior art processes produce hydrogen-rich asphaltenes which are difficult and expensive to handle, process, and melt (liquefy) at relatively low temperatures. These asphaltenes cannot be used as solid fuel, are difficult to blend into fuel oils, and are not generally usable and desirable for asphalt paving or for use in other products.

Refiners have used deasphalting processes to fractionate low sulfur reside ("LSR") and to enhance the processing of the resulting fractions. Typically, the low sulfur resid is fractionated into an oils fraction and a heavy fraction including resins and asphaltenes.

The oils fraction is a desirable feed for a catalytic cracking process because it contains relatively small amounts of metals, nitrogen, and refractory coke-forming compounds. Typical catalytic cracking yield from the oils fraction are similar to those obtained from virgin gas oils. The small amounts of metals and refractory compounds allow large amounts of the oils fraction to be processed in a catalytic cracker ("FCCU").

However, low sulphur resids are relatively poor feedstocks for a resid hydrotreating processes. In resid hydrotreating, the resid is subjected to a high temperature process in the presence of hydrogen and a hydrogenation catalyst. The objectives of these processes, such as a conventional hydrotreating process, is to remove sulfur, nitrogen, and metals, and to saturate olefins and aromatic compounds. In addition, the resid boils above 1000° F. where it is converted to lighter products, which can be subsequently upgraded in other refining units. High sulfur reside ("HSR") is significantly more reactive than low sulfur resids in hydrotreating processes. These qualities limit the usefulness of the low sulfur resids in hydrotreating processes.

Compared to high sulfur resids, low sulfur ("LSR") and hydrotreated ("HTR") resids are desirable feeds for deasphalting because they give significant yields of oils, which in turn, are good feeds for catalytic cracking since they are low in metals, sulfur, and resins. However, it is not straightforward and easy to process LSR and HTR resids in a single deasphalter because it is desirable to segregate the asphalt fractions. Moreover, the HTR asphalt fractions is refractory, while the LSR resid is reactive, to hydrotreating and coking.

Therefore, it is desirable to provide means for and methods of deasphalting LSR and HTR in a single unit in order to segregate the components of HTR and LSR to best advantage.

BRIEF DESCRIPTION OF THE INVENTION

Accordingly, an object of the invention is to provide means for and methods of integrating resid hydrotreating unit process that efficiently and effectively converts vacuum resid into valuable distillable liquids.

Another object of the invention is to provide an integrated resid hydrotreating unit process which enables low sulfur and high sulfur resids to be upgraded in common resid hydrotreating units, and which enables the unique characteristics of each of these resids to be used to full advantage.

Yet another object is to provide a solvent extraction process that fractionates resids into separate feedstreams that are most suitable for use as: hydrotreater feed, catalytic cracking feed, and coker feed or solid or liquid fuel.

Still another object is to provide a hydrotreating process which gives a high conversion resid for use as gasoline blending stocks and other distillable liquids.

In keeping with an aspect of the invention, a process deasphalts hydrotreated (HTR) and low sulfur (LSR) resids in a single unit and in a way that optimizes the disposition of the oils, resins, and asphalt fractions of each resid for downstream processing. After the refractory asphalt is separated from the HTR resid, the LSR resid is introduced into the deasphalter so that its resin and asphaltene fractions are combined with the HC resins. The oils fractions from the two resids are combined and then used as a feedstock to a resid hydrotreating unit.

BRIEF DESCRIPTION OF THE DRAWINGS

The invention will be best understood by reference to the following specification taken with the attached drawings, in which.

DETAILED DESCRIPTION OF THE INVENTION

Figure 1:
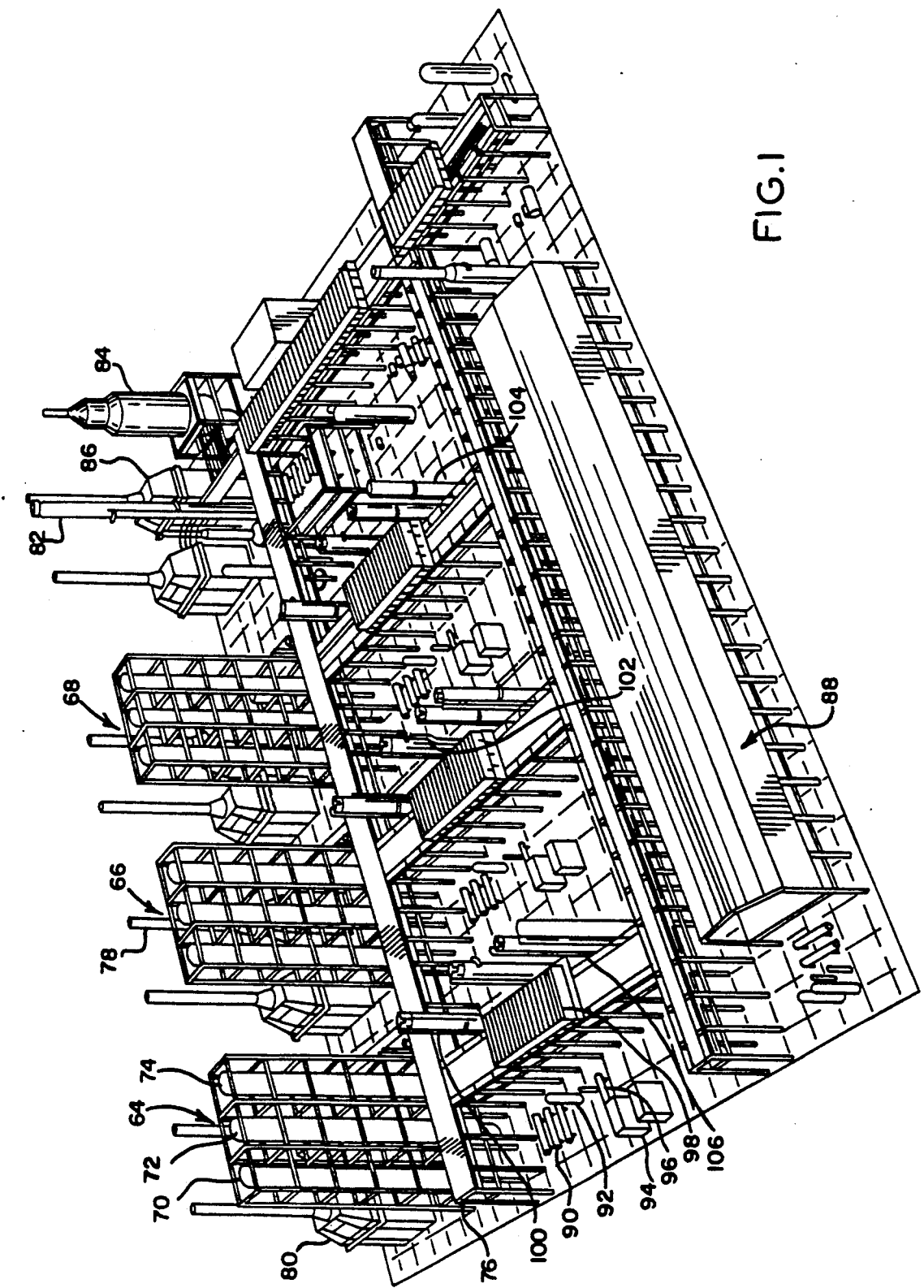
FIG. 1 is a perspective and schematic view of a resid hydrotreating unit ("RHU") which may use the invention.

By way of example, FIG. 1 shows a resid hydrotreating unit ("RHU") of the Amoco Oil Company, which is located in Texas City, Tex. However, the inventive separator may be added to almost any resid hydrotreating unit.

The resid hydrotreating units ("RHU") and associated refining equipment of FIG. 1 comprise three identical parallel trains 64, 66, 68 of cascaded ebullated bed reactors 70, 72 and 74, as well as hydrogen heaters 78, influent oil heaters 80, an atmospheric tower 82, a vacuum tower 84, a vacuum tower oil heater 86, a hydrogen compression area 88, oil preheater exchangers 90, separators 92, recycled gas compressors 94, flash drums 96, separators 98, raw oil surge drums 100, sponge oil flash drums 102, amine absorbers and recycle gas suction drums 104, and sponge oil absorbers and separators 106.

As shown in FIG. 1, each train of reactors includes resid hydrotreating ebullated bed units 64, 66, and 68 include three cascaded ebullated bed reactors 70, 72, 74. Hydrogen is injected into these ebullated bed reactors through feed line 76. A resid is fed to the reactor where it is hydroprocessed (hydrotreated) in the presence of ebullated (expanded) fresh and/or equilibrium hydrotreating catalyst and hydrogen to produce an upgraded effluent product stream with reactor tail gases (effluent off gases) leaving used spent catalyst. Hydro-processing in the resid hydrotreating unit (RHU) includes demetallization, desulfurization, denitrogenation, resid conversion, oxygen removal (deoxygenation), hydrotreating, removal of Ramscarbon, and the saturation of olefinic and aromatic hydrocarbons.

The oil feed to the ebullated bed reactor typically comprises resid oil (resid) and heavy gas oil and decanted oil. The feed gas comprises upgraded recycle gases and fresh makeup gases. Demetallization primarily occurs in the first ebullated bed reactor (such as 70) in each train of reactors. Desulfurization occurs throughout all of the ebullated bed reactors in each train. The effluent product stream typically comprises light hydrocarbon gases, hydrotreated naphtha, distillates, light and heavy gas oil, and unconverted hydrotreated resid. The hydrotreating catalyst typically comprises a metal hydrogenating component dispersed on a porous refractory, inorganic oxide support.

Low sulfur and hydrotreated resids have physical properties which, in many respects, represent extremes in resid properties. It has been surprisingly and unexpectedly found that these resids can be advantageously processed in the same solvent extraction unit and in a manner that provides efficient separation of the resids into components that are effectively processed in downstream resid conversion processes.

Figure 2:
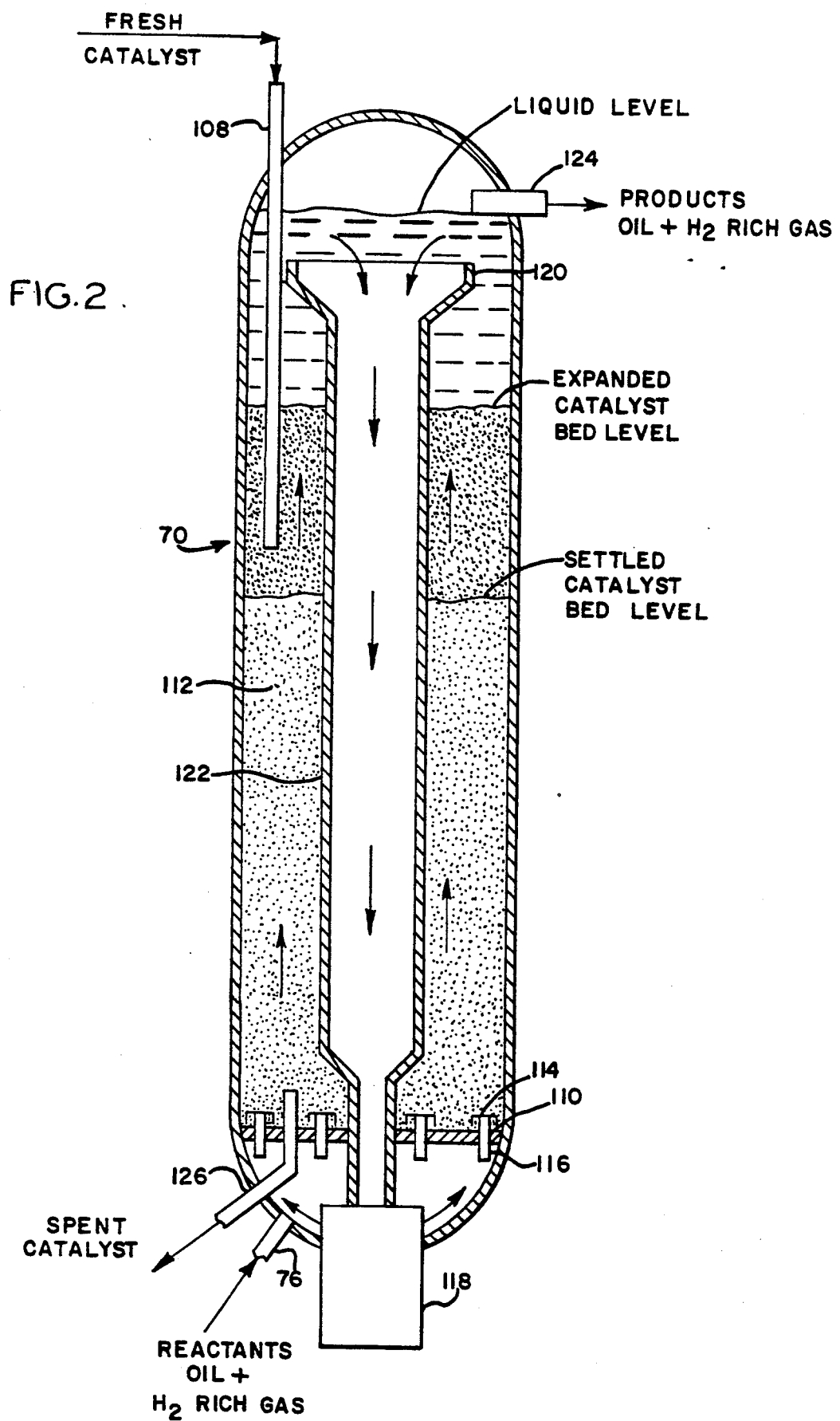
FIG. 2 is a cross-sectional view of an ebullated bed reactor.

FIG. 2 shows an exemplary ebullated bed reactor, such as 70 in FIG. 1. Fresh hydrotreating catalyst is fed downwardly into the top of the first ebullated bed reactor 70 through the fresh catalyst feed line 108. Hydrogen-rich gases and feed comprising resid, resins, flash drum recycle, and decanted oil, enter the bottom of the first ebullated bed reactor 70 through feed line 76 and flows upwardly through a distributor plate 110 into the fresh catalyst bed 112. The distributor plate contains numerous bubble caps 114 and risers 116 which help distribute the oil and the gas across the reactor. An ebullated pump 118 circulates oil from a recycle pan 120 through a downcomer 122 and the distributor plate 110. The rate is sufficient to lift and expand the catalyst bed from its initial settled level to its steady state expanded level. The effluent product stream of partially hydrotreated oil and hydrogen-rich gases are withdrawn from the top of the reactor through effluent product line 124. The used spent catalyst is withdrawn from the bottom of the reactor through spent catalyst discharge line 126.

The spent catalyst typically contains deposits of metals, such as nickel and vanadium, which have been removed from the influent feed oil (resid) during hydrotreating.

Catalyst particles are suspended in a three-phase mixture of catalyst, oil, and hydrogen-rich feed gas in the reaction zone of the reactor. Hydrogen-rich feed gas typically continually bubble through the oil. The random ebullating motion of the catalyst particles results in a turbulent mixture of the phases which promotes good contact mixing and minimizes temperature gradients.

The cascading of the ebullated bed reactors in a series of three per reactor train, in which the effluent of one reactor serves as the feed to the next reactor, greatly improves the catalytic performance of the backmixed ebullated bed process. Increasing the catalyst replacement rate increases the average catalyst activity.

Figure 3:
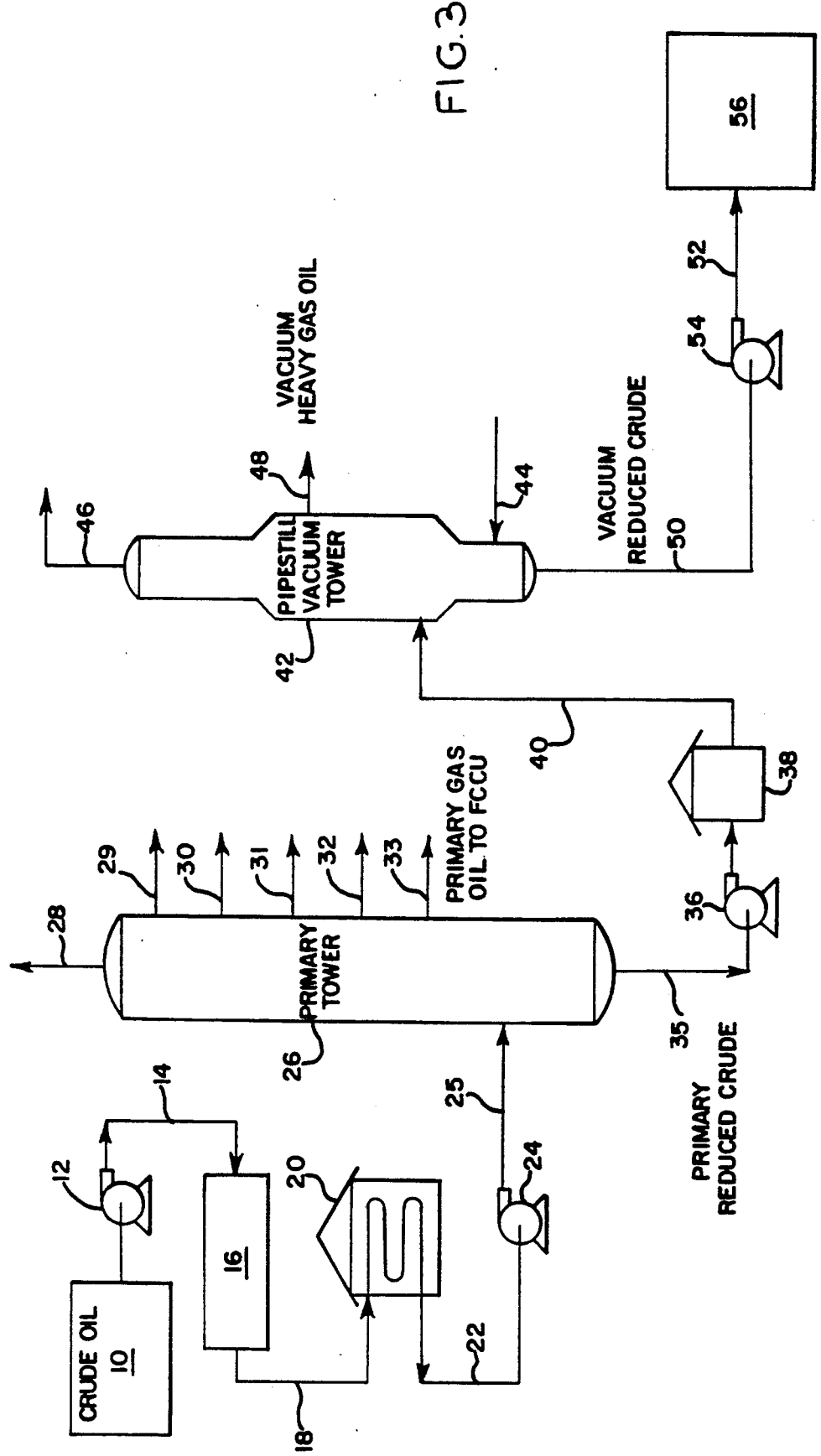
FIG. 3 is a schematic flow diagram for partially refining crude oil.

In refining (FIG. 3), unrefined, raw, whole crude oil (petroleum) is withdrawn from an aboveground storage tank 10 at about 75° F. to about 80° F. by a pump 12 and pumped through feed line 14 into one or more desalters 16 to remove particulates, such as sand, salt, and metals, from the oil. The desalted oil is fed through furnace inlet line 18 into a pipestill furnace 20 where it is heated to a temperature, such as to 750° F. at a pressure ranging from 125 to 200 psi. The heated oil is removed from the furnace through exit line 22 by a pump 24 and pumped through a feed line 25 to a primary distillation tower 26.

The heated oil enters the flash zone of the primary atmospheric distillation tower, pipestill, or crude oil unit 26 before proceeding to its upper rectifier section or the lower stripper section. The primary tower is preferably operated at a pressure less than 60 psi. In the primary tower, the heated oil is separated into fractions of wet gas, light naphtha, intermediate naphtha, heavy naphtha, kerosene, virgin gas oil, and primary reduced crude. A portion of the wet gas, naphtha, and kerosene is preferably refluxed (recycled) back to the primary tower to enhance fractionation efficiency.

Figure 4:
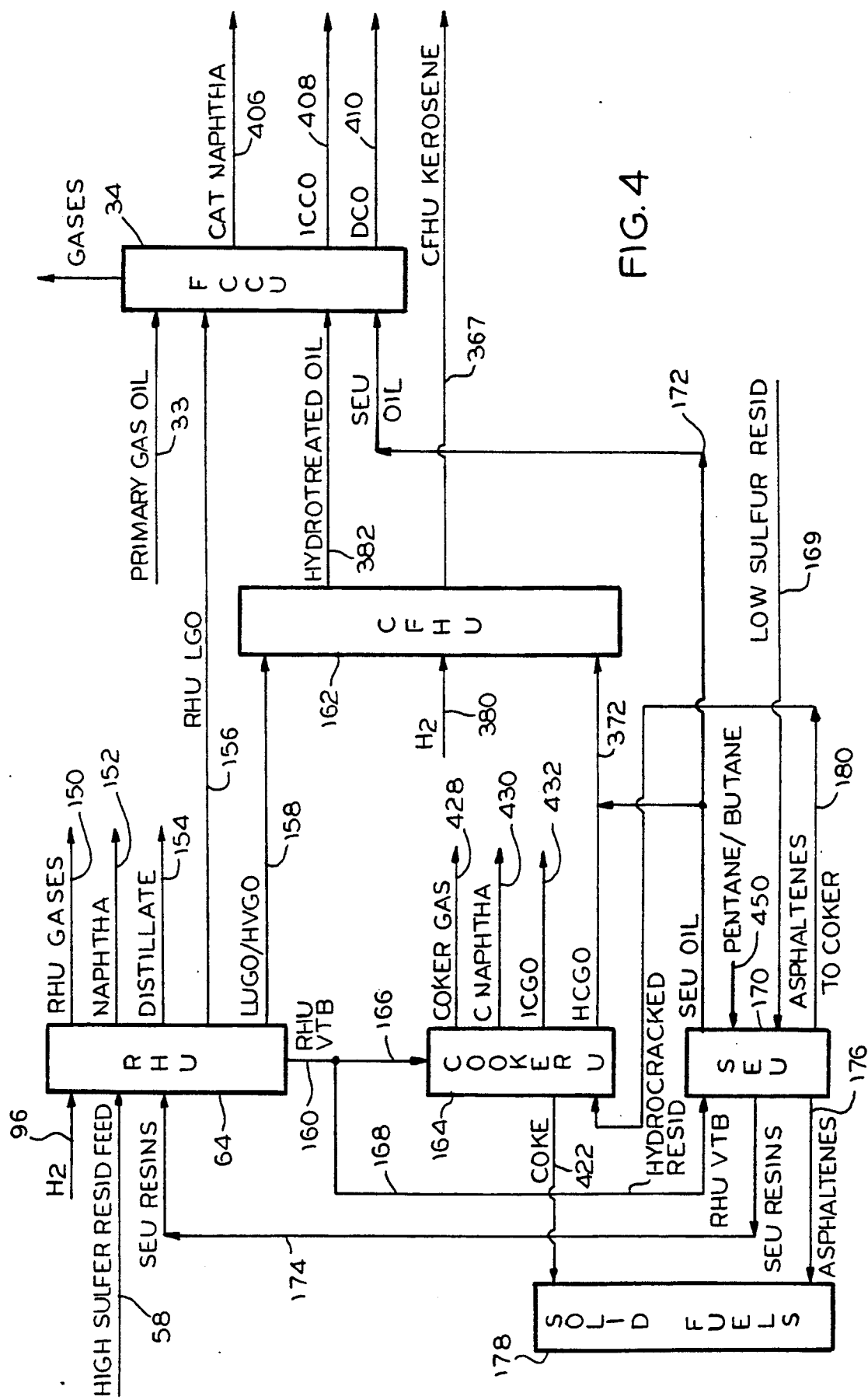
FIG. 4 is a schematic flow diagram of a refinery in accordance with principles of the present invention.

Wet gas is withdrawn from the primary tower 26 through overhead wet gas line 28. Light naphtha is removed from the primary tower through light naphtha line 29. Intermediate naphtha is removed from the primary tower through intermediate naphtha line 30. Heavy naphtha is withdrawn from the primary tower 26 through heavy naphtha line 31. Kerosene and oil for producing jet fuel and furnace oil are removed from the primary tower through kerosene line 32. Primary virgin, atmospheric gas oil is removed from the primary tower through primary gas oil line 33 and pumped to the fluid catalytic cracking unit (FCCU) 34 (FIG. 4).

Primary reduced crude is discharged from the bottom of the primary tower 26 (FIG. 2) through the primary reduced crude line 35. The primary reduced crude in line 35 is pumped by pump 36 into a furnace 38 where it is heated, such as to a temperature from about 520° F. to about 750° F. The heated primary reduced crude is conveyed through a furnace discharge line 40 into the flash zone of a pipestill vacuum tower 42.

The pipestill vacuum tower 42 is preferably operated at a pressure ranging from 35 to 50 mm of mercury. Steam is injected into the bottom portion of the vacuum tower through steam line 44. In the vacuum tower, wet gas is withdrawn from the top of the tower through overhead wet gas line 46. Heavy and/or light vacuum gas oil are removed from the middle portion of the vacuum tower through heavy gas oil line 48. Vacuum-reduced crude is removed from the bottom of the vacuum tower through vacuum-reduced crude line 50. The vacuum-reduced crude typically has an initial boiling point near about 1000° F.

Figure 7:
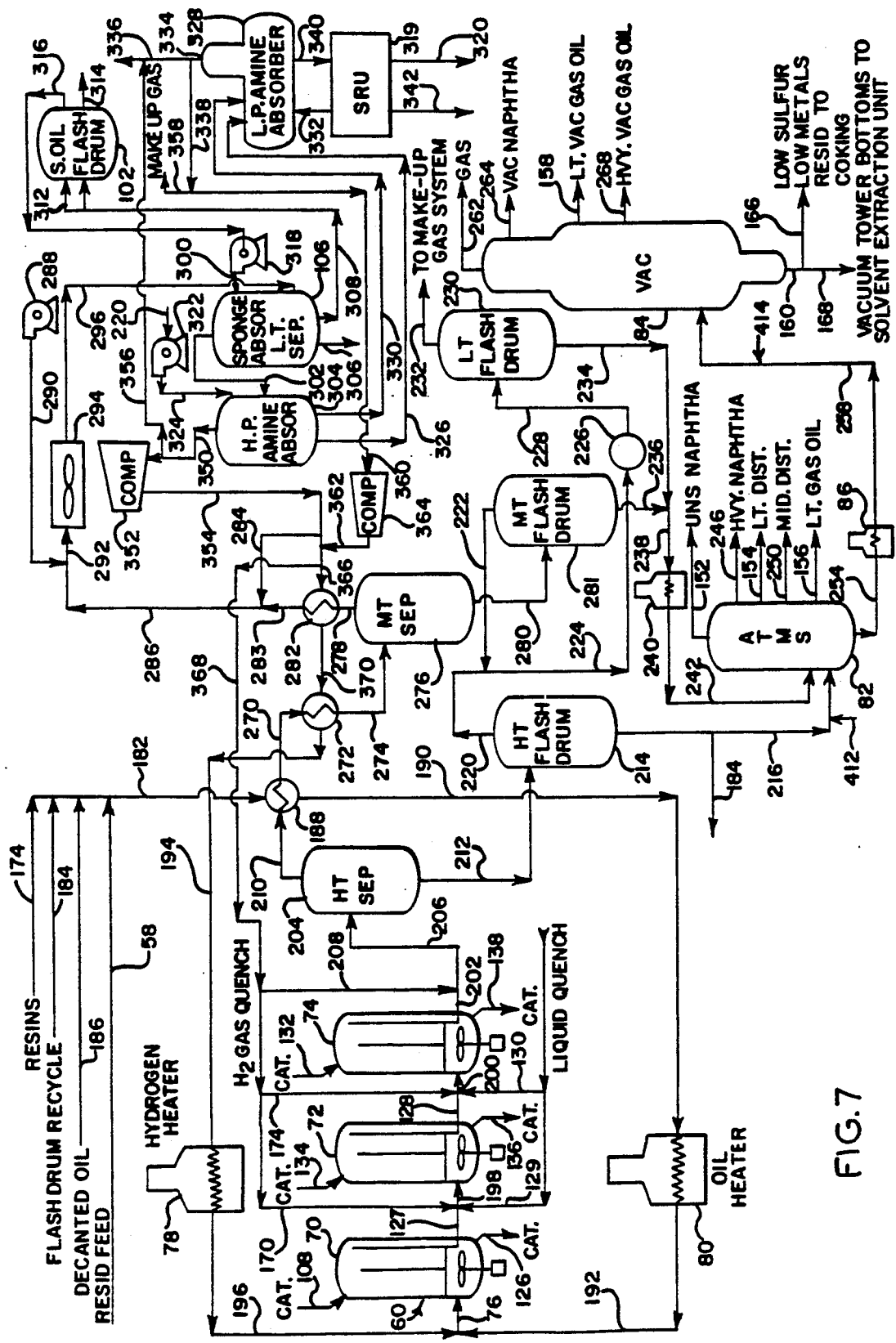
FIG. 7 is a schematic flow diagram of a resid hydrotreating unit.

The vacuum-reduced crude, also referred to as resid, resid oil, and virgin unhydrotreated resid, is pumped through vacuum-reduced crude lines 50 and 52 by a pump 54 into a feed drum or surge drum 56. Resid oil is pumped from the surge drum through resid feed line 58 (FIG. 4) into a resid hydrotreating unit complex 64 (RHU) comprising three resid hydrotreating units and associated refining equipment as shown in FIG. 7.

As shown in FIG. 4, the products produced form the resid hydrotreating units in the ebullated bed reactors include: light hydrocarbon gases (RHU gases) in the gas line 150; naphtha comprising light naphtha, intermediate naphtha, heavy naphtha and vacuum naphtha in one or more naphtha lines 152; distillate comprising light distillate and mid-distillate in one or more distillate lines 154; light gas oil in gas oil line 156; light vacuum gas oil and heavy vacuum gas oil in one or more vacuum gas oil lines 158; and hydrotreated vacuum resid comprising vacuum tower bottoms in a vacuum resid line 160.

Light and intermediate naphthas can be sent to a vapor recovery unit for use as gasoline blending stocks and reformer feed. Heavy naphtha can be sent to the reformer to produce gasoline. The mid-distillate oil is useful for producing diesel fuel and furnace oil, as well as for conveying and/or cooling the spent catalyst. Resid hydrotreated (RHU) light gas oil is useful as feedstock for the catalytic cracking unit 34. Light and heavy vacuum gas oils can be upgraded in a catalytic feed hydrotreating unit 162 (CFHU). Some of the vacuum resid comprising resid hydrotreating unit vacuum tower bottoms (RHU VTB) ca be sent to the coker unit 164 via coker inlet line 166 to produce coke. A substantial portion of the vacuum resid (RHU VTB) can be fed through a feeder line or inlet line 168 to a deasphalter or deasphalting unit 170 where the vacuum resid is separated into deasphalted oil, deasphalted resins, and asphaltenes.

In the preferred embodiment, the deasphalter comprises a solvent extraction unit (SEU) operated with supercritical solvent recovery. A solvent (preferably pentane, butane or mixtures thereof) is introduced via line 450. The oil feeds are vacuum tower bottoms from the resid hydrotreating unit (RHU VTB) 168 and low sulfur resid 169. Deasphalted solvent-extracted oil (SEU oil) in SEU oil line 172 is useful as feedstock to the catalytic cracking unit 34 to increase the yield of gasoline and other hydrocarbon liquids. Deasphalted solvent-extracted resins (SEU resins) in SEU resin line 174 are useful as part of the feed to the resid hydrotreating unit (RHU) 60 to increase the yield of more valuable lower-boiling liquid hydrocarbons. A portion of the asphaltenes can be conveyed or passed through an asphaltene line or chute 176 or otherwise transported to a solid fuels mixing and storage facility 178, such as tank, bin or furnace, for use as solid fuel. Another portion of the solvent-extracted asphaltenes (SEU asphaltenes) can be conveyed or passed through a SEU asphaltene line or chute 180 to the coker 164.

Figure 5:
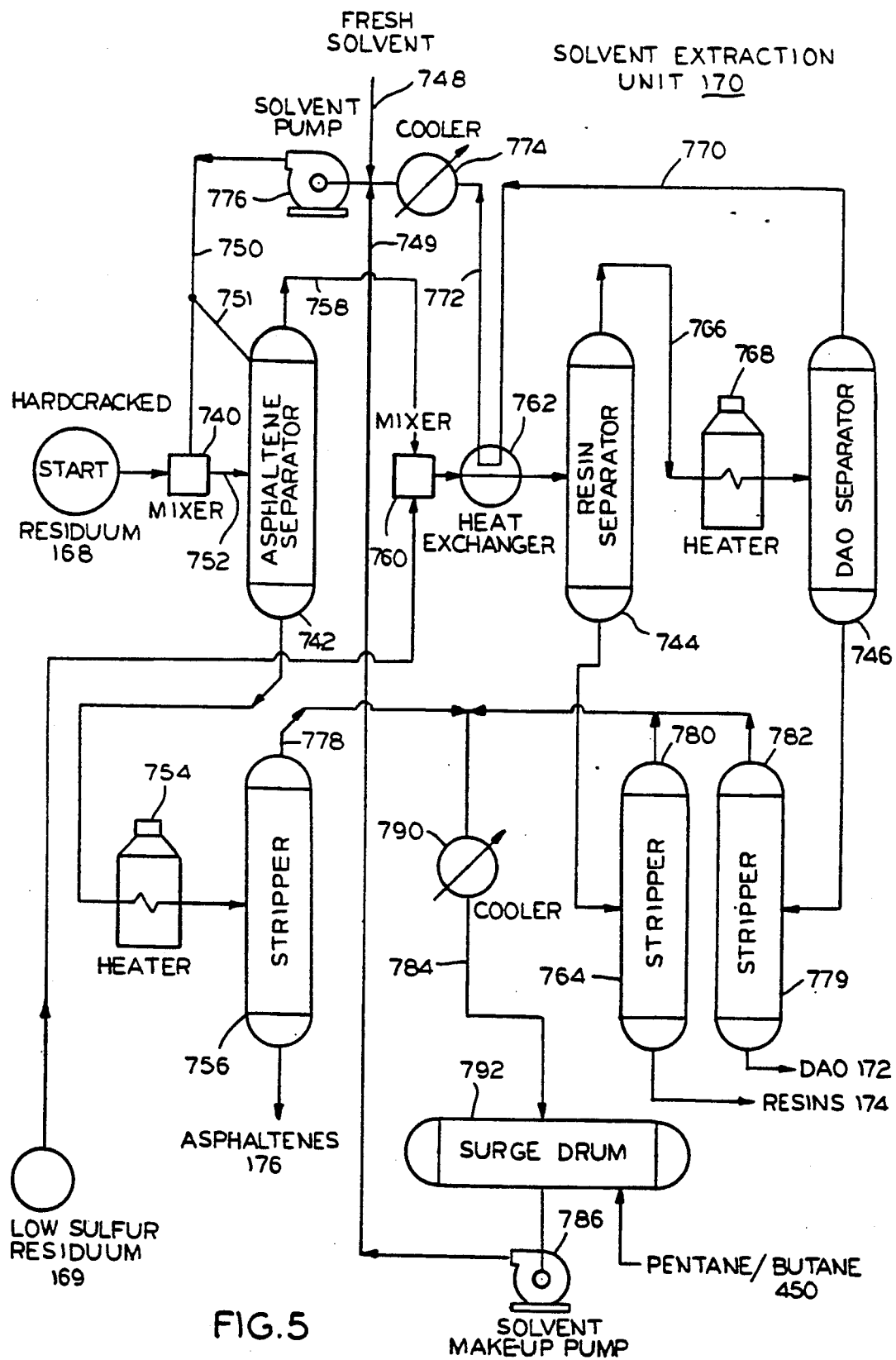
FIG. 5 schematically shows a three stage solvent separator.

A three stage separator solvent extraction unit 170 is shown in FIG. 5, although a two stage separator, similar to these three stages may also be used.

The solvent extraction deasphalting unit 170 (SEU) of FIG. 5 comprises a mixer 740 and three separator vessel or zones 742, 744, and 746 operated slightly below or above the supercritical condition of the solvent. The start of the inventive method begins at line 168 where hydrotreated residuum is fed into the mixer, mixing vessel, or mixing zone 740. Fresh, recycled, and makeup solvents in fresh solvent line 748 and recycled solvent line 749 are pumped through a combined solvent line 756 and into the mixer 740. For best results, the solvent comprises substantially pentane and/or butane and mixtures thereof. The total solvent (fresh and recycle solvent) to feed (vacuum tower bottoms) ratio is from about 3:1 to about 20:1 and preferably from about 8:1 to about 12:1 for best results. In some circumstances, it may be desirable to use or include other solvents.

In the preferred embodiment, only a minority of the solvent in mixer 740 is mixed directly with the vacuum tower bottoms. The small amount of vacuum tower bottoms and solvent are mixed in the mixer 740 and conveyed through a resid-solvent line 752 to separator 742 where it extracts the asphaltenes. The remainder of the solvent is fed through line 751 into asphaltene separator 742 in a countercurrent flow. In some circumstances it may be desirable for the vacuum tower bottoms and solvent to be fed directly into the first separator 742 in the above ratios, without previously mixing the vacuum tower bottoms and solvent in mixer 740.

In the first separator (asphaltene separator) 442, the SEU asphaltenes containing a substantial amount of organometallic components are solvent-extracted and separated from the mixture of solvent and hydro-treated resid (vacuum tower bottoms). A substantial amount of the solvent-extracted asphaltenes are withdrawn from the bottom of the first separator 742 and fed through a heater 754 and stripper 756 through SEU asphaltene line 176 and conveyed or otherwise transported to a solids fuel area 178 (FIG. 4) for use as a solid fuel. Some of the solvent-extracted asphaltenes might also be withdrawn from the first separator 742, optionally stripped of residual solvent, and conveyed or otherwise transported through chute 180 (FIG. 4) to the coker unit 164.

The first separator 742 can be operated at a temperature from about 150° F. to above the critical temperature of the solvent and at a pressure which is at least equal to the vapor pressure of the solvent when at a temperature below the critical temperature of the solvent and which is at least equal to the critical pressure of the solvent when at a temperature equal to or above the critical temperature of the solvent. Preferably, the operating temperature of the first separator 742 ranges from about 40° F. below the critical temperature of the solvent to about the critical temperature of the solvent. The operating pressure of the first separator 742 is the same as the pressure of the third separator 746, plus any pressure drops between the vessels 742 and 746.

The low sulfur residuum (LSR) is fed through line 169 (FIGS. 4 and 5) to mixer 760 where it is combined with the output of the first stage separator. The majority of the solvent and the remaining resins and oil components of the hydrotreated resid are withdrawn from the first separator 742 and conveyed through residue line 758, mixer 760. The mixed LSR and separator 742 output are fed through a heater or heat exchanger 762 to the second separator resin separator vessel 744.

The second separator 744 is maintained at a temperature level which is higher than the temperature level in the first separator 742 and at the same pressure as the first separator vessel 742 minus any pressure drops between separator vessels 742 and 744. In separator 744, there is a separation of the influent residue into a first fluid-like, light phase comprising oils and solvent and a second fluid-like, heavy phase comprising resins and a minority of the solvent. The light phase which separates within second separator 744 is delivered from the top of the second separator 444.

In the second separator (resin separator) 744, deasphalted resins are solvent-extracted and separated from the influent residue. More particularly, the solvent-extracted deasphalted resins are discharged from the bottom of separator 744 through a stripper 764 and SEU resin line 174 (FIG. 4) and fed to an ebullated bed reactor 70 of the resid hydrotreating unit (FIG. 1).

In the preferred embodiment, the second separator 744 is operated at a temperature above that in the first separator 742. The pressure level of second separator 744 is maintained equal to the vapor pressure of the first separator 742 minus any pressure drop between the separator vessels 742 and 744, so that flow between the vessels 742 and 744 can occur through an overflow and does not require the use of a pump. However, if desired, a pump could be used since a vapor-liquid equilibrium would enable the first vessel 742 to be operated at a pressure below that of second vessel 744.

Preferably, the operating temperature of the second separator 744 is from about 5° F. to about 100° F. above the temperature in the first separator 742, and most preferably at a temperature of from about 5° F. to about 50° F. above the critical temperature of the solvent. The operating pressure of the second separator 744 is substantially the same pressure level that is maintained in first separator 742.

The remaining residue of solvent and oil are withdrawn from the second separator 744 and forwarded through a second residue line 766 and passed via a heater or heat exchanger 768 to the third separator (oil separator) vessel or zone 746 which acts a flash drum or flash zone in which solvent is separated from the oil. In the third separator 746, the now substantially deasphalted, demetallized, resin-free (deresined) oil is separated from the solvent. The third separator 746 is operated at an elevated temperature (higher than the temperature of the solvent) to effect this separation of the oil and solvent. When operating at a supercritical condition, no heat of vaporization is required to separate the solvent from the SEU oil, thereby enhancing the energy efficacy of the deasphalter. The pressure in the third separator 746 is preferably at least equal to the critical pressure of the solvent. Preferably, the temperature in the third separator 746 is maintained at least about 50° above the critical temperature of the solvent.

The solvent which is withdrawn from the top of third separator 746 is recycled through lines 770 and 772 into the mixer 740 via heat exchanger 762, cooler 774, and pump 776. The solvent-extracted oil (SEU oil) is discharged from the third separator 746 through stripper 777, and SEU oil line 172 (FIGS. 4, 5) and fed to the catalytic cracker (FCCU) 34 (FIG. 4), or CFHU 162 as part of its feedstock.

The heavy phases of asphaltenes, resins, and SEU oil, from the first, second and third separators, respectively, can be passed into the individual stripping sections 756, 764, and 777, such as stream strippers, which strip away any solvent that may be contained in the phases. The recovered solvent can be recycled (pumped) through lines 778, 780, 782, 784, surge drum 792, pump 786, and line 749, pump 776, and line 756 to mixer 740 or counter current line 751. The recovered solvent can optionally be passed through a cooler 790, heater, or other heat exchanger as well as a surge drum 792, before being pumped through the recycle line 749.

It should be noted that the solvent extractor of FIG. 5 uses a hydrotreated feedstream at 68 and a low sulfur feedstream at 169. These two feedstreams are mixed and then the oils are separated from asphaltenes, and resins. Hence, when the oils are sent downstream in the resid hydrotreating unit, there is less change of fouling and a greater output of the desirable lighter fractions.

The output oil is taken from the third separator stage 746 at output 172 may be fed to either the CFHU 162 or FCCU 34 (FIG. 4). The output from the second stage 744 is recycled to the RHU 64 via line 174. The asphaltenes are forwarded to solid fuels 178 or coker 164.

Heavy coker gas oil from line 372 (FIG. 4), light vacuum gas oil and/or heavy vacuum gas oil from the heavy and possibly solvent extracted oil from line 172 are conveyed into an optional catalytic feed hydrotreater or catalytic feed hydrotreating unit (CFHU) 162 where it is hydrotreated with hydrogen from hydrogen feed line 380 at a pressure ranging from about atmospheric pressure to 2000 psia, preferably from about 1000 psi to about 1800 psia at a temperature approximately ranging from 650° F. to 750° F. in the presence of a hydro-treating catalyst. The hydrotreated gas oil is discharged through a catalytic feed hydrotreater discharge line 382.

Solvent-extracted deasphalted oil in SEU oil line 172 is fed and conveyed into the bottom portion of a catalytic cracking (FCCU) reactor unit 34. The catalytic cracking unit can have a stripper section. Catalytic feed hydrotreated oil in line 382 and light atmospheric gas oil in RHU LGO gas oil line 156 can also be fed and conveyed into the bottom portion of the catalytic cracking reactor 34. Kerosene can be withdrawn from the catalytic feed hydrotreating unit CFHU 162 through kerosene line 367.

In the FCCU reactor 34, the hydrocarbon feedstock is vaporized upon being mixed with the hot cracking catalyst. The feedstock is catalytically cracked to more valuable, lower molecular weight hydrocarbons. The temperatures in the reactor can range from about 900° F. to about 1025° F. at a pressure from about 5 psig to about 50 psig. The circulation rate (weight hourly space velocity) of the cracking catalyst in the reactor can range from about 5 to about 200 WHSV. The velocity of the oil vapors in the riser reactor can range from about 5 ft/sec. to abut 100 ft/sec.

Suitable cracking catalysts include, but are not limited to, those containing silica and/or alumina, including the acidic type. The cracking catalyst may contain other refractory metal oxides such as magnesia or zirconia. Preferred cracking catalysts are those containing crystalline aluminosilicates, zeolites, or molecular sieves in an amount sufficient to materially increase the cracking activity of the catalyst, e.g., between about 1 to about 25% by weight. The crystalline aluminosilicates can have silica-to-alumina mole ratios of at least about 2:1, such as from about 2 to 12:1, preferably about 4 to 6:1 for best results.

The crystalline aluminosilicates are usually available or made in sodium form and this component is preferably reduced, for instance, to less than about 4 or even less than about 1% by weight through exchange with hydrogen ions, hydrogen-precursors such as ammonium ions, or polyvalent metal ions. Suitable polyvalent metals include calcium, strontium, barium, and the rare earth metals such as cerium, lanthanum, neodymium, and/or naturally-occurring mixtures of the rare earth metals. Such crystalline materials are able to maintain their pore structure under the high temperature conditions of catalyst manufacture, hydrocarbon processing, and catalyst regeneration. The crystalline aluminosilicates often have a uniform pore structure of exceedingly small size with the cross-section diameter of the pores being in a size range of about 6 to 20 angstroms, preferably about 10 to 15 angstroms.

Silica-alumina based cracking catalysts having a major proportion of silica, e.g., about 60 to 90 weight percent silica and about 10 to 40 weight percent alumina, are suitable for admixture with the crystalline aluminosilicate or for use as such as the cracking catalyst. Other cracking catalysts and pore sizes can be used. The cracking catalyst can also contain or comprise a carbon monoxide (CO) burning promoter or catalyst, such as a platinum catalyst to enhance the combustion of carbon monoxide in the dense phase in the regenerator.

The effluent product stream of catalytically cracked hydrocarbon gases is withdrawn from the top of the FCCU reactor 34 through an overhead product line. Naphtha is withdrawn from the FCCU fractionator 34 through a naphtha line 406. Decanted oil (DCO) is withdrawn from the bottom of the FCCU fractionator 34 through a decanted oil line 410. To help minimize and decrease the concentration of carbonaceous asphaltenic solids formed during resid hydrotreating, some of the decanted oil from decanted oil line 410 can be injected into the combined feed line 58 (FIG. 4) as part of the input feedstock to the RHU 64. In addition thereto, some of the decanted oil from line 410 can be fed into an atmospheric tower and/or into a vacuum tower to minimize precipitation and conglomeration of asphaltenic solids in the towers. For best results, the total amount of diluent (decanted oil) injected into the atmospheric and vacuum towers ranges from about 5% to less than 20%, and preferably from about 7% to about 12%, by weight of the influent resid oil feedstock.

Solvent-extracted asphaltenes from the SEU asphaltene line 180 (FIG. 4) can also be conveyed to the coker 164. In the coker, the vacuum tower bottoms and solvent-extracted asphaltenes are coked at a coking temperature of about 895° F. to about 915° F. at a pressure of about 10 psig to about 50 psig. Coke is withdrawn from the coker through a chute, conduit, or one or more lines and transported to a coke storage area for use as solid fuel.

Coker product vapors can be withdrawn from the coker 164 and passed (fed) to a combined coker tower. In the combined coker tower, the coker product vapors can be separated into fractions of coker gas, coker naphtha, light coker gas oil, and heavy coker gas oil. Coker gas can be withdrawn from the combined tower through coker gas line 428. Coker naphtha can be withdrawn from the combined tower through light coker gas line 432 Heavy coker gas oil (HCGO) can be withdrawn from the combined tower through heavy coker gas oil line 372 and hydrotreated in the catalytic feed hydrotreater (CRHU) 162 before being catalytically cracked in the catalytic cracker 34 (FCCU).

Although LSR and HTR resids could be processed in separate deasphalting units, this option is likely to be less economic than the inventive combined processing. The resulting outflowing streams from the unit have the fractions from the HTR and LSR resids which may be commingled as desired. First, the asphalt stream contains only the HTR asphalt fraction, which is refractory to further refining. Second, the resins stream contains the HTR and LSR resins, and the LSR asphalt fractions, which give an appreciable light oils yield upon hydrotreating or coking. Third, the oils streams contains the HTR and LSR oils fractions, which are good feeds for further catalytic cracking because they have a low ramscarbon, sulfur, and metals contents. Also, the oils may be upgraded in a catalytic feed hydrotreating in order to further improve their value as a feed stream to a catalytic cracker.

Thus, a principle benefit of this invention is that LSR and HTR resids can be deasphalted in a single unit in a way that allows the oils, resins, and asphalt fractions from each resid to be segregated for optimal conversions into light oils. Also, as compared to a process where the LSR and HTR are commingled, it is likely that the solvent to feed ratio ca be reduced because the HTR asphalt cut is taken before the LSR resid is introduced into the deasphalter. This favorable ratio reduces the size of the deasphalting unit relative to a system where the HTR and LSR are commingled and fed as a single stream.

EXAMPLE 1

Table I gives the results of an inspection of a high sulfur virgin resid and the fractions obtained by extraction with n-butane using the inventive process. The resid gives a high yield of "DAO" (deasphalted oil), but contains large amounts of sulfur, and is advantageously upgraded by a treatment in the RHU. The asphaltenes have a high ramscarbon content and low hydrogen content. However, as will be shown in subsequent examples, the asphaltenes can be converted into more valuable products in the RHU. Similarly, the resins can be upgraded in the RHU.

TABLE I

Fractions Obtained By Solvent Extraction Of A Virgin High Sulfur Resid With N-Butane

|  | Feed | DAO (Deasphalted Oil) | Resins | Asphaltenes |
|---|---|---|---|---|
| wt % Yield | — | 40 | 15 | 45 |
| °API | 5.3 | 15.6 | 7.9 | −3.2 |
| Wt-% S | 4.1 | 3.1 | 4.1 | 4.9 |
| wt % N | 0.54 | 0.27 | 0.45 | 0.94 |
| H/C Atomic Ratio | 1.41 | 1.63 | 1.45 | 1.18 |
| wt % Ramscarbon | 21.8 | 4.2 | 14.3 | 39.6 |
| Metals, ppm |  |  |  |  |
| V | 187 | 8 | 59 | 393 |
| Ni | 55 | 10 | 24 | 107 |
| Fe | 20 | <2 | 3 | 52 |

EXAMPLE 2

Table II gives the results of inspections of virgin low sulfur resid and the fractions obtained by solvent extraction with n-butane by using the process of the present invention. The deasphalted oil ("DAO") fraction represents two thirds of the feed, and is a suitable feedstock for catalytic cracking or catalytic feed hydrotreating because the DAO contains low amounts of sulfur, Ramscarbon, and metals. As was the case for the virgin high sulfur resid, the resins and asphaltenes are suitable feeds for the RHU.

TABLE II

Fractions Obtained By Solvent Extraction Of A Low Sulfur Resid With N-Butane

|  | Feed | DAO (Deasphalted Oil) | Resins | Asphaltenes |
|---|---|---|---|---|
| wt % Yield | — | 66 | 20 | 14 |

TABLE II-continued

Fractions Obtained By Solvent Extraction
Of A Low Sulfur Resid With N-Butane

|  | Feed | DAO (Deasphalted Oil) | Resins | Asphaltenes |
|---|---|---|---|---|
| °API | 13.8 | 18.8 | 10.0 | 0.5 |
| wt % S | 1.02 | 0.77 | 1.24 | 1.79 |
| wt % N | 0.46 | 0.27 | 0.57 | 0.93 |
| H/C Atomic Ratio | 1.58 | 1.69 | 1.51 | 1.20 |
| wt % Ramscarbon | 11.1 | 4.1 | 15.8 | 36.6 |
| Metals, ppm |  |  |  |  |
| V | 49 | 4 | 49 | 257 |
| Ni | 28 | 11 | 35 | 124 |
| Fe | 7 | <2 | 7 | 246 |

EXAMPLE 3

Figure 6:
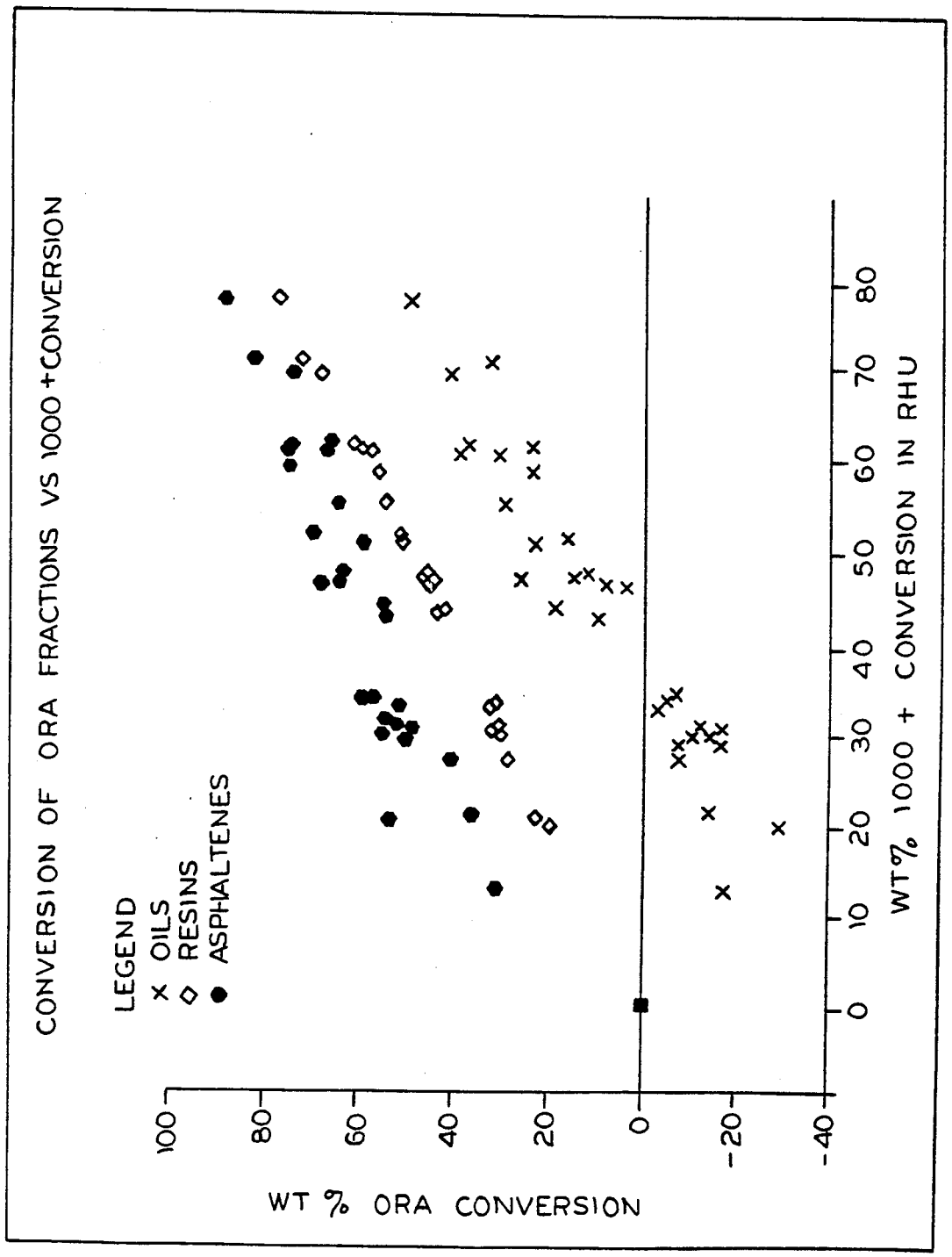
FIG. 6 is a graph showing the conversion of oil, resin, and asphaltenes.

FIG. 6 is a graph which shows the conversion of the deasphalted oils (DAO), resins, and asphaltene fractions as a function of the total resid conversion into distillable liquids which are obtained from the RHU. The feed is a blend of virgin resids similar to those given in Examples 1 and 2. It can be seen that the asphaltene fraction is the most reactive, and is readily converted into (a) distillable liquids, or (b) DAO, or (c) resins. The reactivity of the asphaltenes levels off for higher resid conversions because the remaining asphaltenes are more unreactive and coke-like. The resins have an average reactivity. On-average, the oils are the least reactive. The apparent negative conversion of oils is observed from the results of the conversion of resids and asphaltenes into oils for small extents of resid conversion. The oils are relatively paraffinic, and therefore are less reactive in the thermal cracking reactions. However, paraffinic components are quite susceptible to catalytic cracking and are readily converted into gasoline in an FCCU.

EXAMPLE 4

Table III gives the results of inspections of a hydrotreated resid which are obtained after 70% of the original resid was converted to distillable liquids. From Table III it can be seen that the hydrotreated resid gives a significant yield of DAO, which is low in sulfur, Ramscarbon, and metals. Thus, the original resid is a suitable feed for catalytic cracking or catalytic feed hydrotreating. The properties of hydrotreated resins are similar to the properties of resins from virgin resins and are readily converted upon recycling to the RHU. However, the asphaltenes are so deficient in hydrogen and so rich in Ramscarbon that they are substantially unreactive to further hydrotreating.

TABLE III

Fractions Obtained By Solvent Extraction
Of A Hydrotreated Resid With N-Butane

|  | Feed | DAO (Deasphalted Oil) | Resins | Asphaltenes |
|---|---|---|---|---|
| wt % Yield |  | 31 | 31 | 38 |
| °API | 2.2 | 17.7 | 14.0 | — |
| wt % S | 2.6 | 1.37 | 1.75 | 3.27 |
| wt % N | 0.61 | 0.27 | 0.36 | 1.04 |
| H/C Atomic Ratio | 1.29 | 1.55 | 1.50 | 0.96 |
| wt % Ramscarbon | 26.6 | 4.6 | 9.3 | 59.0 |
| Metals, ppm |  |  |  |  |
| V | 76 | 0 | 2 | 231 |
| Ni | 39 | 0 | 0 | 107 |
| Fe | 6 | 1 | 0 | 42 |

EXAMPLE 5

Table IV shows the yield which was obtained by the catalytic cracking of a whole, virgin, low sulfur resid and the DAO fraction at a constant conversion of 65%. It can be seen that the oils fraction gives a higher yield of the desirable naphtha fraction, which is in the gasoline boiling range, and lower yields of the undesirable coke and light gases. Thus, it is apparent that the DAO is a more suitable feedstock for catalytic cracking than the whole resin.

TABLE IV

Oils Fraction Obtained By Solvent Extraction
With Butane
FCCU Yields @ 65% Conversion

|  | Whole Low Sulfur Resid | Oil Fraction |
|---|---|---|
| Light Gases ($H_2$, $H_2S$, C1's, C2's) | 4.9 | 4.1 |
| $C_3$ and $C_4$ Gases | 13.7 | 11.1 |
| Naphtha ($C_5$-430° F.) | 34.7 | 40.6 |
| Cycle Oils | 35.0 | 35.0 |
| Coke | 10.5 | 7.9 |

EXAMPLE 6

Table V compares the yields obtained by hydrotreating a whole, virgin, high sulfur resid, the resins fraction from a hydrotreated resid, and the whole hydrotreated resid. In these tests, each feed was treated separately. The virgin resid and resins fraction have similar reactivities with the resins being more reactive for desulfurization, Ramscarbon removal, and denitrogenation, and slightly less reactive for 1000°+F. conversion. The whole, hydrotreated resid is significantly less reactive in all cases, thus illustrating the benefit of selectively recycling the resins fractions to the hydrotreater.

TABLE V

Hydrotreating Results For Various Feeds
(wt % Conversion) (@ 1800 psi Hydrogen, 787° F., 0.22 LHSV)

|  | High Sulfur Resid | Resins | Hydrotreated Resid |
|---|---|---|---|
| % Desulfurization | 80 | 86 | 47 |
| % Ramscarbon Removal | 57 | 66 | 24 |
| % Denitrogenation | 29 | 46 | 14 |
| % 1000°+ F. Conversion | 50 | 44 | 19 |

(Ran Neat In A Fixed Bed Reactor Over Equilibrium Catalyst)

In operation and as shown in FIG. 7, a relatively high sulfur resid oil feed, which can contain heavy gas oil, is conveyed by a resid feed line 58 to a combined feed line 182. Solvent-extracted resins in resin line 174 are also fed to combined feed line. Flash drum recycle oil in flash drum recycle line 184 and decanted oil (DCO) in decanted oil line 186 can also be fed and mixed in combined feed line 182. The feed in combined feed line 182 comprising resid, SEU resins, decanted oil, and flash drum recycle oil is conveyed to a heat exchanger 188 where the feed is preheated. The feed is conveyed through a preheated feed line 190 to an oil heater 80 where it is heated to a temperature ranging from about 650° F. to 750° F. The heated feed (feedstock) is passed through a heated influent feed line 192 to an oil gas feed line 76.

Hydrogen-containing feed gas in the feed gas line 194 is fed into a hydrogen heater or feed gas heater 78 where it is heated to a temperature ranging from about 650° F. to about 900° F. The feed gas is a mixture of upgraded, methane-lean tail gases (effluent off gases)

and hydrogen-rich, fresh makeup gases comprising at least about 95% by volume hydrogen and preferably at least about 96% by volume hydrogen. The feed gas comprises a substantial amount of hydrogen, a lesser amount of methane, and small amounts of ethane. The heated feed gas is conveyed through the heated feed gas line 196 to the gas oil feed line 76 where it is conveyed along with the heated resid oil to the first ebullated bed reactor 70.

Fresh hydrotreating catalyst is fed into the first ebullated bed reactor 70 through the fresh catalyst line 108. Spent catalyst is withdrawn from the first reactor through the spent catalyst line 126. In the first reactor, the resid oil is hydroprocessed (hydrotreated), ebullated, contacted, and mixed the hydrogen-rich feed gas in the presence of the hydrotreating catalyst at a temperature of about 700° F. to about 850° F., at a pressure of about 2650 psia to about 3050 psia, and at a hydrogen partial pressure of about 1800 psia to about 2300 psia to produce a hydrotreated (hydroprocessed), upgraded, effluent product stream. The product stream is discharged from the first reactor through the first reactor discharge line 127 and conveyed through the second reactor feed line 198 into the second ebullated bed reactor 72. A liquid quench can be injected into the product feed entering the second reactor through a liquid quench line 129. The liquid quench can be sponge oil. A gas quench can be injected into the product feed before it enters the second reactor through a gas quench line 170. The gas quench preferably comprises a mixture of upgraded, methane-lean tail gases (effluent off gases) and fresh makeup gases.

Hydrotreating catalyst, which may be removed from the third reactor, is fed into the second reactor 72 through an influent catalyst line 134. Used spent catalyst is withdrawn from the second reactor through the second spent catalyst line 136. In the second reactor, the effluent resid oil product is hydroprocessed, hydrotreated, ebullated, contacted, and mixed with the hydrogen-rich feed gas and quench gas in the presence of the hydrotreating catalyst at a temperature of about 700° F. to about 850° F., at a pressure from about 2600 psia to about 3000 psia and at a hydrogen partial pressure of about 1700 psia to about 2100 psia to produce an upgraded effluent product stream. The product stream is discharged from the second reactor through a second reactor discharge line 128.

The product feed is then fed into the third ebullated bed reactor 74 through a third reactor feed line 200. A liquid quench can be injected into the third reactor feed through an inlet liquid quench line 130. The liquid quench can be sponge oil. A gas quench can be injected into the third reactor feed through an input gas quench line 174. The gas quench can comprise upgraded, methane-lean tail gases and fresh makeup gases. Fresh hydrotreating catalyst is fed into the third reactor through a fresh catalyst line 132. Used spent catalyst is withdrawn from the third reactor through the third reactor spent catalyst line 138. In the third reactor, the resid feed is hydroprocessed, hydrotreated, ebullated, contacted, and mixed with the hydrogen-rich gas in the presence of the hydrotreating catalyst at a temperature from about 700° F. to about 850° F., at a pressure of about 2550 psia to about 2950 psia and at a hydrogen partial pressure from about 1600 psia to about 2000 psia to produce an upgraded product stream. The product stream is withdrawn from the third reactor through the third reactor discharge line 202 and fed into a high-temperature, high-pressure separator 204 via inlet line 206. A gas quench can be injected into the product stream in the inlet line through a gas quench line 208 before the product stream enters the high-temperature separator. The gas quench can comprise upgraded, methane-lean tail gases and fresh makeup gases.

The upgraded effluent product streams discharged from the reactors comprise hydrotreated resid oil and reactor tail gases (effluent off gases). The tail gases comprise hydrogen, hydrogen sulfide, ammonia, water, methane, and other light hydrocarbon gases, such as ethane, propane, butane, and pentane.

In the high-temperature (HT) separator 204, the hydrotreated product stream is separated into a bottom stream of high-temperature, hydrotreated, heavy oil liquid and an overhead stream of gases and hydrotreated oil vapors. The high-temperature separator 204 is operated at a temperature of about 700° F. to about 850° F. and at a pressure from about 2500 psia to about 2900 psia. The overhead stream of gases and oil vapors is withdrawn from the high-temperature separator through an overhead line 210. The bottom stream of high-temperature heavy oil liquid is discharged from the bottom of the high-temperature separator through a high-temperature separator bottom line 212 and fed to a high-temperature flash drum 214.

In the high-temperature flash drum 214, the influent stream of heavy oil liquid is separated and flashed into a stream of high-temperature vapors and gases and an effluent stream of high-temperature, heavy oil liquid. The flash drum effluent, high-temperature, hydrotreated, heavy resid oil liquid (flash drum effluent) is discharged from the bottom of the flash drum 214 through the high-temperature flash drum bottom line 216. Part or all of the flash drum effluent in line 216 is fed into an atmospheric tower 82. Preferably, part of the flash drum effluent comprises flash drum recycle which is recycled to the first ebullated bed reactor 70 through flash drum recycle line 184 as part of the oil feed. The high-temperature flash gas and vapors are withdrawn from the high-temperature flash drum 214 through a high-temperature flash drum overhead line 220 and are conveyed, blended, and intermixed with medium-temperature overhead flash vapors from the medium-temperature (MT) flash drum overhead line 222 through a combined, common flash line 224. The combined flash gas and vapors are optionally cooled in one or more heat exchangers or coolers 226 before being conveyed through a line 228 to the low temperature (LT) flash drum 230.

In the LT flash drum 230, the influent high-temperature flash gases and vapors are separated into low-pressure gases and light oil liquid. The low-pressure gases are withdrawn from the LT flash drum through an outlet gas line 232 and conveyed downstream to the makeup gas system for use as sweet fuel. The light oil liquid is discharged from the LT flash drum through a light oil line 234 and is conveyed, blended, and intermixed with medium-temperature, light oil liquid from the medium-temperature, flash drum light oil line 236 in a combined, common light oil line 238. The combined medium-temperature, light oil liquid is heated in a furnace 240 and conveyed through a light oil feed line 242 to the atmospheric tower 82.

In the atmospheric tower 82, the hydrotreated, high-temperature, heavy oil liquid from the high-temperature flash drum effluent oil line 216 and the hydrotreated, medium-temperature, light oil liquid from the medium-temperature oil line 242 can be separated into fractions of light and intermediate naphtha, heavy naphtha, light distillate, mid-distillate, light atmospheric gas oil, and atmospheric hydrotreated resid oil. Light and intermediate naphtha can be withdrawn from the atmospheric tower through an unstable naphtha line 152. Heavy naphtha can be withdrawn from the atmospheric tower through a heavy naphtha line 246. Light distillate can be withdrawn from the atmospheric tower through a light distillate line 154. Mid-distillates can be withdrawn from the atmospheric tower through a mid-distillate line 250. Light virgin atmospheric gas oil can be withdrawn from the atmospheric tower through a light atmospheric gas oil line 156. Atmospheric resid oil is discharged from the bottom portion of the atmospheric tower through the atmospheric resid line 254 and heated in an atmospheric resid oil heater 86 before being conveyed through a vacuum tower feed line 258 to the vacuum tower 84.

In vacuum tower 84, the atmospheric influent, hydrotreated resid oil can be separated into gases, vacuum naphtha, light vacuum gas oil, heavy vacuum gas oil, and hydrotreated, vacuum resid oil or vacuum resid. The gases are withdrawn from the vacuum tower through an overhead vacuum gas line 262. Vacuum naphtha can be withdrawn from the vacuum tower through a vacuum naphtha line 264. Light vacuum gas oil (LVGO) can be withdrawn from the vacuum tower through a light vacuum gas oil line 158. Heavy vacuum gas oil (HVGO) can be withdrawn from the vacuum tower through a heavy vacuum gas oil line 268. Vacuum resid oil (vacuum resid) is withdrawn from the bottom of the vacuum tower 84 through a RHU vacuum tower bottoms line 160. Some of the vacuum resid is fed to a coker via a vacuum resid discharge line 166. The rest of the vacuum resid is conveyed to the solvent extract unit via a vacuum resid line 168.

Referring again to the high-temperature separator 204 (FIG. 7), high-temperature gases and oil vapors are withdrawn from the high-temperature separator 204 through an overhead vapor line 210 and cooled in a resid feed heat exchanger 188 which concurrently preheats the oil and resin feed in combined line 182 before the oil and resin feed enters the oil heater 80. The cooled vapors and gases exit the heat exchanger 188 and are passed through an intermediate line 270 and cooled in a high-temperature gas quench heat exchanger 272 which concurrently preheats the feed gas before the feed gas passes through the hydrogen heater inlet line 19 into the hydrogen heater 78. The cooled gases and vapors exit the heat exchanger 272 and are passed through a medium-temperature inlet line 274 to a medium-temperature, high-pressure separator 276.

In the medium-temperature (MT) separator 276, the influent gases and oil vapors are separated at a temperature of about 500° F. and at a pressure of about 2450 psia to about 2850 psia into medium-temperature gases and hydrotreated, medium-temperature liquid. The medium-temperature gases are withdrawn from the MT separator through a medium-temperature gas line 278. The medium-temperature liquid is discharged from the bottom of the MT separator through a medium-temperature liquid line 280 and conveyed to a medium-temperature flash drum 281.

In the medium-temperature (MT) flash drum 281, the influent medium-temperature liquid is separated and flashed into medium-temperature vapors and effluent medium-temperature, hydrotreated liquid. The medium-temperature flash vapors are withdrawn from the MT flash drum through a medium-temperature overhead line 222 and injected, blended, and mixed with the high-temperature overhead flash gases and vapors in the combined, common flash line 224 before being cooled in heat exchanger 226 and conveyed to the LT flash drum 230. The effluent medium-temperature liquid is discharged from the MT flash drum 281 through a light oil discharge line 236 and is injected, blended, and mixed with the low-temperature liquid from the LT flash drum in combined, common light oil liquid line 238 before being heated in the light oil heater 240 and conveyed to the atmospheric tower 82.

In the MT separator 276, the medium-temperature effluent gases exit the MT separator through an MT gas line 278 and are cooled in a medium-temperature (MT) feed gas heat exchanger 282 which also preheats the feed gas before the feed gas is subsequently heated in the HT heat exchanger 272 and the hydrogen heater 78. The cooled medium-temperature gases exit the MT heat exchanger 282 through a medium-temperature (MT) gas line 282 and are combined, blended and intermixed with compressed gas from an anti-surge line 284 in a combined, common gas line 286. The gas and vapors in gas line 286 are blended, diluted and partially dissolved with wash water line 290, in a combined water gas inlet line 292. Ammonia and hydrogen sulfide in the tail gases react to form ammonium bisulfide which dissolves in the injected water. The gas and water products in line 292 are cooled in an air cooler 294 and conveyed through a sponge absorber feed line 296 into a sponge oil absorber and low-temperature (LT) separator 106.

Lean sponge oil is fed into the sponge oil absorber 106 through a lean sponge oil line 300. In the sponge oil absorber, the lean sponge oil and the influent tail gases are circulated in a countercurrent extraction flow pattern. The sponge oil absorbs, extracts, and separates a substantial amount of methane and ethane and most of the $C_3$, $C_4$, $C_5$, and $C_6+$ light hydrocarbons (propane, butane, pentane, hexane, etc.) from the influent product stream. The sponge oil absorber operates at a temperature of about 130° F. and at a pressure of about 2700 psia. The effluent gases comprising hydrogen, methane, ethane, and hydrogen sulfide are withdrawn from the sponge oil absorber through a sponge oil effluent gas line 302 and fed into a high-pressure (HP) amine absorber 304.

Effluent water containing ammonium bisulfide is discharged from the bottom of the sponge oil absorber 106 through an effluent water line 306 and conveyed to a sour water flash drum, a sour water degassing drum, and/or other wastewater purification equipment and recycled or discharged.

Rich sponge oil effluent containing $C_3$, $C_4$, $C_5$, and $C_6+$ absorbed light hydrocarbons is discharged from the bottom portion of the sponge absorber 106 through a rich sponge oil line 308 and conveyed to a sponge oil flash drum 102. Vacuum naphtha and/or middle distillate can also be fed into the sponge oil (SO) flash drum through a sponge-oil naphtha line 312 as a stream to keep a level in the sponge oil system. In the sponge oil flash drum 102, the rich sponge oil is flashed and separated into light hydrocarbon gases and lean sponge oil. The flashed light hydrocarbon gases are withdrawn from the SO flash drum 102 through a gas line 314 and conveyed downstream for further processing. Lean sponge oil is discharged from the SO flash drum 102 through a lean sponge oil discharge line 316 and pumped (recycled) back to the sponge oil absorber via sponge oil pump 318 and line 300. Some of the lean sponge oil can also be used as the liquid quench. The ammonia-lean, $C_3$+lean reactor tail gases containing hydrogen sulfide, hydrogen, methane, and residual amounts of ethane are fed into the high pressure (HP) amine absorber 304 through an amine absorber inlet line 302. Lean amine from the sulfur recovery unit (SRU) 319 lean amine discharge line 320 is pumped into the HP amine absorber 304 by a lean amine pump 322 through a lean amine inlet line 324. In the HP amine absorber 304, lean amine and influent tail gases are circulated in a countercurrent extraction flow pattern at a pressure of about 2500 psia. The lean amine absorbs, separates, extracts, and removes substantially all the hydrogen sulfide from the influent tail gases.

Rich amine containing hydrogen sulfide is discharged from the bottom of the HP amine absorber 304 through a rich amine line 326 and conveyed to a low-pressure (LP) amine absorber 328. The lean amine absorber 328. The lean amine from the sulfur recovery unit is recycled back to the high-pressure and low-pressure amine absorbers through the lean amine line. Skimmed oil recovered in the HP amine absorber 304 is discharged from the bottom of the HP amine absorber through a high-pressure (HP) skimmed oil line 330 and passed to the LP amine absorber 328. Lean amine from the sulfur recovery unit (SRU) 319 is also pumped into the LP amine absorber 328 through a LP lean amine inlet line 332.

In the LP amine absorber 328, the influent products are separated into gases, rich amine, and skimmed oil. Gases are withdrawn from the LP amine absorber 328 through a gas line 334 and conveyed downstream through line 336 for use as sweet fuel or added to the fresh makeup gas through auxiliary gas line 338. Rich amine is discharged from the LP amine absorber 328 through a rich amine discharge line 340 and conveyed to a sulfur recovery unit (SRU) 319. Skimmed oil can also be withdrawn from the LP amine absorber and conveyed to the SRU 319 through line 340 or a separate line. The sulfur recovery unit can take the form of a Claus plant, although other types of sulfur recovery units can also be used. Sulfur recovered from the tail gases are removed by the tail gas cleanup equipment through sulfur recovery line 342.

In the HP amine absorber 304 of FIG. 7, the lean amine influent absorbs, separates, extracts and removes hydrogen sulfide from the influent stream leaving upgraded reactor tail gases (off gases). The upgraded reactor tail gases comprise about 70% to about 80% by volume hydrogen and about 20% to 30% by volume methane, although residual amounts of ethane may be present. The upgraded reactor tail gases are withdrawn from the high-pressure amine absorber through an overhead, upgraded tail gas line 350 and conveyed to a recycle compressor 352. The recycle compressor increases the pressure of the upgraded tail gases. The compressed tail gases are discharged from the compressor through a compressor outlet line 354. Part of the compressed gases can be passed through an antisurge line 284 and injected into the combined gas line 286 to control the inventory, flow and surging of the medium-temperature gases being conveyed to the sponge oil absorber 106. Other portions of the gases prior to compression can be bled off through a bleed line or spill line 356 and used for fuel gas or for other purposes as discussed below.

Fresh makeup gases comprising at least about 95% hydrogen, preferably at least 96% hydrogen, by volume, from a hydrogen plant are conveyed through fresh makeup gas lines 358, 360, and 362 (FIG. 7) by a makeup gas compressor 364, along with gas from gas line 338, and injected, mixed, dispersed, and blended with the main portion of the compressed upgraded tail gases in a combined, common feed gas line 366. The ratio of fresh makeup gases to compressed recycle tail gases in the combined feed gas line 366 can range from about 1:2 to about 1:4.

About 10% by volume of the blended mixture of compressed, upgraded, recycled reactor tail gases (upgraded effluent off gases) and fresh makeup hydrogen gases in combined feed gas line 366 are bled off through a quench line 368 for use as and third ebullated bed reactors through the second reactor inlet quench line 170 and the third reactor inlet quench line 174 and are injected into the effluent hydrotreated product stream exiting the third reactor through quench line 208.

The remaining portion, about 90% by volume, of the blended mixture of compressed, upgraded, recycled, reactor tail gases (upgraded off gases) and fresh makeup gases in the combined feed gas line 366 comprise the feed gases. The feed gases in the combined feed gas line 366 are preheated in a medium-temperature (MT) heat exchanger 282 (FIG. 7) and passed through a heat exchanger line 370 to a high-temperature (HT) heat exchanger 272 where the feed gases are further heated to a higher temperature. The heated feed gases are discharged from the HT heat exchanger 272 through a discharge line 194 and passed through a hydrogen heater 78 which heats the feed gases to a temperature ranging from about 650° F. to about 900° F. The heated hydrogen-rich feed gases exit the hydrogen heater 78 through a feed gas line 196 and are injected (fed) through an oil-gas line 76 into the first ebullated bed reactor 70.

Heavy coker gas oil from line 372 (FIG. 4), light vacuum gas oil from the light vacuum gas oil line 158, and/or heavy vacuum gas oil from the heavy vacuum gas oil lines 268 or 48 (FIG. 3) and possibly solvent extracted oil 172 (FIG. 4) are conveyed into an optional catalytic feed hydrotreater or catalytic feed hydrotreating unit (CFHU) 162 (FIG. 4) where it is hydrotreated with hydrogen from hydrogen feed line 380 at a pressure ranging from atmospheric pressure to 2000 psia, preferably from about 1000 psia to about 1800 psia at a temperature ranging from 650° F. to 750° F. in the presence of a hydro-treating catalyst. The hydrotreated gas oil is discharged through a catalytic feed hydrotreater discharge line 382.

Figure 8:
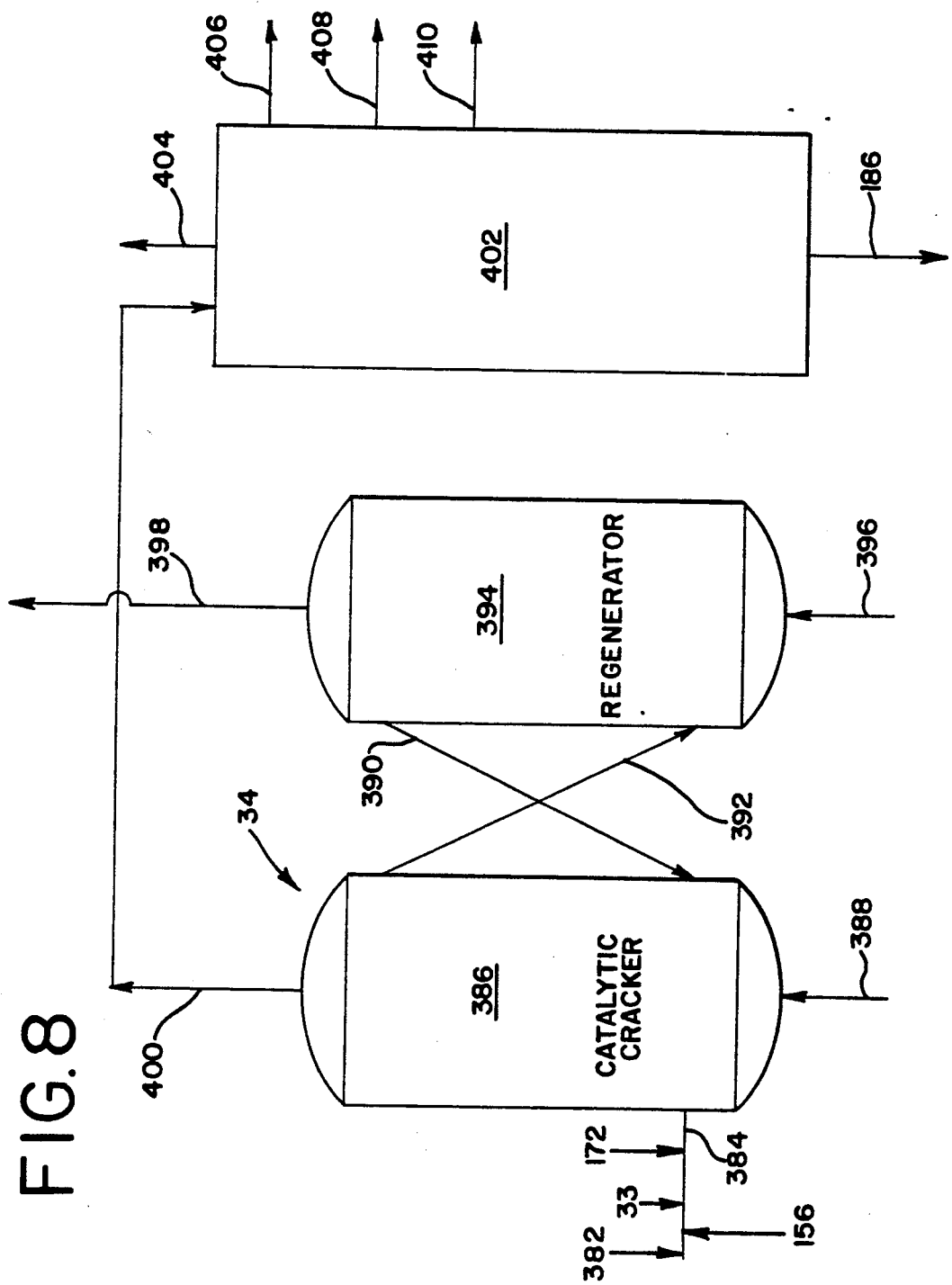
FIG. 8 is a schematic flow diagram of a catalytic cracking unit.

Solvent-extracted deasphalted oil in SEU oil line 17 (FIG. 8) is fed and conveyed via a combined catalytic feed line 384 in the bottom portion of a catalytic cracking (FCC) reactor 386 of a fluid catalytic cracker (FCC) unit 34. Catalytic feed hydrotreated oil in line 382 and light atmospheric gas oil in RHU LGO gas oil line 156 and/or primary gas oil in line 33 from the primary tower 26 (pipestill) (FIG. 3) can also be fed and conveyed via combined catalytic feed line 384 into the bottom portion of the catalytic cracking reactor 386. Kerosene can be withdrawn from the catalytic feed hydrotreating unit 162 (FIG. 4) through CFHU kerosene line 387.

The catalytic cracking reactor 386 (FIG. 8) can have a stripper section. Preferably, the catalytic cracking reactor comprises a riser reactor. In some circumstances, it may be desirable to use a fluid bed reactor or a fluidized catalytic cracking reactor. Fresh makeup catalytic cracking catalyst and regenerated catalytic cracking catalyst are fed into the reactor through a fresh makeup and regenerated catalyst line 390, respectively. In the FCC reactor, the hydrocarbon feedstock is vaporized upon being mixed with the hot cracking catalyst and the feedstock is catalytically cracked to more valuable, lower molecular weight hydrocarbons. The temperatures in the reactor 386 can range from about 900° F. to about 1025° F. at a pressure from about 5 psig to about 50 psig. The circulation rate (weight hourly space velocity) of the cracking catalyst in the reactor 386 can range from about 5 to about 200 WHSV. The velocity of the oil vapors in the riser reactor can range from about 5 ft/sec to about 100 ft/sec.

Spent catalyst containing deactivating deposits of coke is discharged from the FCC reactor 386 (FIG. 8) through spent catalyst line 392 and fed to the bottom portion of an upright, fluidized catalyst regenerator or combustor 394. The reactor and regenerator together provide the primary components of the catalytic cracking unit. Air is injected upwardly into the bottom portion of the regenerator through an air injector line 396. The air is injected at a pressure and flow rate to fluidize the spent catalyst particles generally upwardly within the regenerator. Residual carbon (coke) contained on the catalyst particles is substantially completely combusted in the regenerator leaving regenerated catalyst for use in the reactor. The regenerated catalyst is discharged from the regenerator through regenerated catalyst line 390 and fed to the reactor. The combustion off-gases (flue gases) are withdrawn from the top of the combustor through an overhead combustion off-gas line or flue gas line 398.

Suitable cracking catalyst include, but are not limited to, those containing silica and/or alumina, including the acidic type. The cracking catalyst may contain other refractory metal oxides such as magnesia or zirconia. Preferred cracking catalysts are those containing crystalline aluminosilicates, zeolites, or molecular sieves in an amount sufficient to materially increase the cracking activity of the catalyst, e.g., between about 1 and about 25% by weight. The crystalline aluminosilicates can have silica-to-alumina mole ratios of at least about 2:1, such as from about 2 to 12:1, preferably about 4 to 6:1 for best results. The crystalline aluminosilicates are usually available or made in sodium form and this component is preferably reduced, for instance, to less than about 4 or even less than about 1% by weight through exchange with hydrogen ions, hydrogen-precursors such as ammonium ions, or polyvalent metal ions. Suitable polyvalent metals include calcium, strontium, barium, and the rare earth metals such as cerium, lanthanum, neodymium, and/or naturally-occurring mixtures of the rare earth metals. Such crystalline materials are able to maintain their pore structure under the high temperature conditions of catalyst manufacture, hydrocarbon processing, and catalyst regeneration. The crystalline aluminosilicates often have a uniform pore structure of exceedingly small size with the cross-sectional diameter of the pores being in the size range of about 6 to 20 angstroms, preferably about 10 to 15 angstroms. Silica-alumina based cracking catalysts having a major proportion of silica, e.g., about 60 to 90 weight percent silica and about 10 to 40 weight percent alumina, are suitable for admixture with the crystalline aluminosilicate or for use as such as the cracking catalyst. Other cracking catalysts and pore sizes can be used. The cracking catalyst can also contain or comprise a carbon monoxide (CO) burning promoter or catalyst, such as a platinum catalyst to enhance the combustion of carbon monoxide in the dense phase in the regenerator 394.

The effluent product stream of catalytically cracked hydrocarbons (volatized oil) is withdrawn from the top of the FCC reactor 386 (FIG. 8) through an overhead product line 400 and conveyed to the FCC main fractionator 402. In the FCC fractionator 402, the catalytically cracked hydrocarbons comprising oil vapors and flashed vapors can be fractionated (separated) into light hydrocarbon gases, naphtha, light catalytic cycle oil (LCCO), heavy catalytic cycle oil (HCCO), and decanted oil (DCO). Light hydrocarbon gases are withdrawn from the FCC fractionator through a light gas line 404. Naphtha is withdrawn from the FCC fractionator through a naphtha line 406. LCCO is withdrawn from the FCC fractionator through a light catalytic cycle oil line 408. HCCO is withdrawn from the FCC fractionator through a heavy catalytic cycle oil line 410. Decanted oil is withdrawn from the bottom of the FCC fractionator through a decanted oil line 186.

Those who are skilled in the art will readily perceive how to modify the invention. Therefore, the appended claims are to be construed to cover all equivalent structures which fall within the true scope and spirit of the invention.

We claim:

1. A process for simultaneously refining hydrotreated and low sulfur resid feedstreams in a single solvent extraction unit having at least three successive solvent extracting separator stages, said process comprising the steps of:
   (a) providing a first source of hydrotreated resid;
   (b) providing a second source of virgin low sulfur resid;
   (c) mixing hydrotreated resid from said first source and a solvent;
   (d) feeding a mixture resulting from step (c) into a first of said separator stages;
   (e) mixing a separated top level output of said first separator stage and a low sulfur resid from said second source;
   (f) feeding a mixture resulting from step (e) into a second of said separator stages;
   (g) feeding a top level output from said second separator stage to said third separator stage;
   (h) withdrawing separated asphaltenes from said first separator stage;
   (i) withdrawing separated resins from said second separator stage; and
   (j) separating and withdrawing solvent and deasphalted oil recovered from said third stage.

2. The process of the claims 1 and the added steps of:
   receiving and processing said asphaltenes into solid fuels;
   receiving and processing said deasphalted oil in at least one of a catalytic feed hydrotreating unit or a fluid catalytic cracking unit;
   receiving and recycling said resins as a feedstream into a resid hydrotreating unit.

3. The process of claim 2 and the added step of stripping solvent from said asphaltenes, deasphalted oil, and resins prior to forwarding them to their respective said receiving means.

4. The process of claim 3 and the added step of:

feeding back said solvent from between at least two of said separator stages to said first said mixing step (c);

and exchanging heat in said fed back solvent with a forwarding flow between at least two of said separator stages.

5. The process of claim 3 and the added step of recycling solvent taken from a top of each of said stripping stage.

6. A process for use in a resid hydrotreating unit, said process comprising the steps of:
(a) hydrotreating high sulfur resid and solvent extracted resins in an ebullated bed resid reactor;
(b) forwarding a hydrotreated resid feed from said ebullated bed reactor to a solvent extraction unit;
(c) forwarding a virgin low sulfur resid feed to said solvent extraction unit;
(d) mixing said hydrotreated feed of step (b) with a solvent and feeding the resulting mixture to a first solvent separator stage;
(e) mixing an output from said first separator stage with a low sulfur resid feed and feeding the resulting mixture to a second solvent separator stage;
(f) recycling a separated stream of resins from said second stage separator to the ebullated bed reactor of step (a);
(g) feeding a top level output from said second separator stage to a third solvent separator stage;
(h) withdrawing deasphalted oil from an output of said third separator stage; and
(i) forwarding a deasphalted oil output from said third separator stage for further processing.

7. The process of claim 6 and the added step of stripping solvents from heavy materials taken from each of said separator stages.

8. The process of claim 6 where solvent used in said separator stages is taken from the class consisting of pentane and butane and mixtures thereof.

9. The process of claim 8 and the added step wherein said first separator stage operates at a temperature in the approximate range from about 150° F. to the critical temperature of the solvent.

10. The process of claim 8 and the added step wherein said first separator stage operates at a pressure which is at least equal to the vapor pressure of the solvent when at the critical temperature of the solvent.

11. The process of claim 9 and the added step wherein the second separator stage operates at a temperature in the approximate range from about 5° F. to about 100° F. above the temperature in the first separator stage.

12. The process of claim 9 and the added step wherein the second separator stage operates at a temperature in the approximate range from about 5° F. to about 50° F. above the temperature in the first separator stage.

13. The process of claim 10 and the added step wherein the operating pressures in the first and second separator stages are approximately the same.

14. The process of claim 6 and the added step of maintaining a temperature in the third separator stage at least about 50° F. above the critical temperature of the solvent.

15. A catalytic cracking process, comprising the steps of:
(a) feeding virgin unhydrotreated resid to a reactor;
(b) feeding resins to said reactor;
(c) feeding hydrotreating catalyst to said reactor;
(d) injecting hydrogen-rich gases to said reactor;
(e) hydrotreating said virgin resid and resins in said reactor by contacting said virgin resid and resins with said hydrogen-rich gases in the presence of said hydrotreating catalyst and in the absence of a hydrogen donor under hydrotreating conditions to produce hydrotreated resid oil;
(f) fractionating said hydrotreated resid oil into fractions of gas oil and resid bottoms;
(g) separating asphaltenes, resins, and deasphalted oil from said resid bottoms by solvent extraction, said separating step comprising feeding a resulting mixture into a first solvent separator, feeding a virgin low sulfur resid to a mixer, mixing a separated top level output of said first solvent separator and said low sulfur resid in said mixer, feeding an output mixture from said mixer into a second solvent separator, feeding a top level output from said second solvent separator to a third solvent separator, withdrawing separated asphaltenes from said first separator stage, withdrawing separated resins from said second stage, and withdrawing separated solvent extracted oil from said third separator;
(h) recycling at least some of said resins to said reactor; and
(i) catalytically cracking at least some of said gas oil and deasphalted oil in the presence of a cracking catalyst and in the absence of hydrogen-rich gases to produce upgraded oil.

16. The process of claim 15 wherein said oils are hydrotreated prior to the catalytic cracking in step (i).

17. A catalytic cracking process, comprising the steps of:
(a) feeding atmospheric gas oil from an atmospheric tower to a cracking reactor of a catalytic cracking unit, said cracking reactor comprising at least one reactor selected from the group consisting of a riser reactor and a catalytic cracker;
(b) feeding primary gas oil from a primary tower to said cracking reactor;
(c) feeding hydrotreated oil from a catalytic feed hydrotreating unit to said cracking reactor;
(d) feeding solvent-extracted oil comprising less than 5 ppm vanadium and less than 5 ppm nickel to said cracking reactor;
(e) feeding fresh and regenerated crystalline aluminosilicate cracking catalyst to said cracking reactor;
(f) catalytically cracking said gas oil, hydrotreated oil and solvent-extracted oil in said cracking reactor in the presence of said cracking catalyst under catalytic cracking conditions to produce cracked oil leaving spent coked catalyst;
(g) conveying said spent coked catalyst to a regenerator of said catalytic cracking unit;
(h) injecting air into said regenerator;
(i) regenerating said spent catalyst by substantially combusting coke on said spent catalyst in the presence of air in said regenerator;
(j) recycling said regenerated catalyst directly from said regenerator to said cracking reactor in the absence of substantially demetallizing said regenerated catalyst;
(k) separating said cracked oil in a fractionator into streams of light hydrocarbon gases, catalytic naphtha, catalytic cycle oil, and decanted oil;
(l) substantially desalting crude oil;
(m) heating said desalted crude oil in a pipestill furnace;

(n) pumping said heated crude oil to a primary distillation tower;

(o) separating said heated crude oil in said primary distillation tower into streams of naphtha, kerosene, primary gas oil, and primary reduced crude oil;

(p) conveying said primary gas oil to said catalytic cracker;

(q) pumping said primary reduced crude oil to a pipestill vacuum tower;

(r) separating said primary gas oil in said pipestill vacuum tower into streams of wet gas, heavy gas oil, and vacuum reduced crude oil providing resid oil;

(s) feeding fresh feed comprising resid oil from said pipestill vacuum tower to a resid hydrotreating unit comprising a series of three ebullated bed reactors;

(t) injecting hydrogen-rich gases into said ebullated bed reactors;

(u) conveying resid hydrotreating catalyst to said ebullated bed reactors;

(v) ebullating said resid oil and said hydrogen-rich gases together in the presence of said resid hydrotreating catalyst in said ebullated bed reactors at a pressure ranging from about 2550 psia to about 3050 psia to produce upgraded hydrotreated resid oil;

(w) forwarding a virgin low sulfur resid feed to a first solvent extraction unit, mixing a hydrotreated feed of step of (v) with a solvent and feeding the resulting mixture to a first solvent separator stage, mixing an output from said first separator stage with said low sulfur resid feed and feeding the resulting mixture to a second solvent separator stage, recycling a separated stream of resins from said second stage separator to join the feed of the step (s) to the ebullated bed reactors of the resid hydrotreating unit, feeding a top level output from said second separator stage to a third solvent separator stage, withdrawing deasphalted oil form an output of said third separator stage, and forwarding a deasphalted oil output from said third separator stage for further processing;

(x) separating at least a portion of said hydrotreated resid oil in an atmospheric tower into atmospheric streams of distillate, gas oil, and atmospheric tower bottoms comprising atmospheric resid oil;

(y) conveying said atmospheric stream of gas oil from said atmospheric tower to said cracking reactor;

(z) separating said atmospheric resid oil in a resid vacuum tower into vacuum streams of vacuum gas oil and vacuum tower bottoms comprising vacuum resid oil;

(aa) conveying said vacuum gas oil from said resid vacuum tower to a catalytic feed hydrotreating unit;

(bb) feeding coker gas oil to said catalytic feed hydrotreating unit;

(cc) injecting hydrogen-rich gases to said catalytic feed hydrotreating unit;

(dd) conveying catalytic feed hydrotreating catalyst to said catalytic feed hydrotreating unit;

(ee) hydrotreating said vacuum gas oil and said coker gas oil with said hydrogen-rich gases in the presence of said catalytic hydrotreating catalyst in said catalytic feed hydrotreating unit to produce hydrotreated oil;

(ff) passing said hydrotreated oil to said cracking reactor;

(gg) conveying a portion of said vacuum tower bottoms from said resid vacuum tower to a coker;

(hh) coking said vacuum tower bottoms in said coker to produce coke and coker resid oil;

(ii) conveying said coker resid oil to a combined tower;

(jj) separating said coker resid oil in said combined tower into streams of coker gases, coker naphtha, and coker gas oil;

(kk) conveying said coker gas oil from said coker to said catalytic feed hydrotreating unit;

(ll) conveying and feeding a substantial portion of said vacuum tower bottoms from said resid vacuum tower to a multistage solvent extraction unit;

(mm) feeding a solvent to said multistage solvent extraction unit, said solvent comprising a member selected from the group consisting of butane and pentane and mixtures thereof;

(nn) substantially deasphalting and solvent-extracting said vacuum tower bottoms with said solvent in said multistage solvent extraction unit to separate said vacuum tower bottoms into streams of substantially deasphalted solvent-extracted oil, substantially deasphalted solvent-extracted resins, and substantially deresined solvent-extracted asphaltenes;

(oo) recovering said solvent under supercritical conditions and recycling said solvent to said solvent extraction unit;

(pp) conveying said resins from said solvent extraction unit to said resid hydrotreating unit;

(qq) transporting at least some of said asphaltenes for use as solid fuel; and (rr) conveying said solvent-extracted oil from said solvent extraction unit to said catalytic feed hydrotreating reactor or said catalytic cracking reactor.

18. A hydrotreating process comprising the steps of:

(a) substantially desalting crude oil;

(b) heating said desalted crude oil in a pipestill furnace (c) pumping said heated crude oil to a primary distillation tower;

(d) separating said heated crude oil in said primary distillation tower into streams of naphtha, kerosene, primary gas oil, and primary reduced crude oil;

(e) pumping said primary reduced crude oil to a pipestill vacuum tower;

(f) separating said primary gas oil in said pipestill vacuum tower into streams of wet gas, heavy gas oil, and vacuum reduced crude oil providing resid oil;

(g) feeding a resid oil feed comprising solvent-extracted resins and said resid oil from said pipestill vacuum tower to a resid hydrotreating unit comprising a series of three ebullated bed reactors;

(h) injecting hydrogen-rich gases into said ebullated bed reactors;

(i) conveying resid hydrotreating catalysts to said ebullated bed reactors;

(j) ebullating said feed comprising said solvent-extracted resins and said resid oil with said hydrogen-rich gases in the presence of said resid hydrotreating catalyst in said ebullated bed reactors under hydrotreating conditions to produce upgraded hydrotreated resid oil;

(k) forwarding a virgin low sulfur resid feed to a first solvent extraction unit, mixing a hydrotreated feed taken from an output of step (i) with a solvent and feeding the resulting mixture to a first solvent separator stage, mixing an output from said first separator stage with said low sulfur resid feed and feeding the resulting mixture to a second solvent separator stage, recycling a separated stream of resins from said second stage separator to join the feed of the step (g) to the ebullated bed reactors of the resid hydrotreating unit, feeding a top level output from said second separator stage to a third solvent separator stage, withdrawing deasphalted oil form an output of said third separator stage, and forwarding a deasphalted oil output from said third separator stage for further processing;

(l) separating at least a portion of said hydrotreated resid oil in an atmospheric tower into atmospheric streams of distillate, atmospheric gas oil, and atmospheric tower bottoms comprising atmospheric resid oil;

(m) separating said atmospheric resid oil in a resid vacuum tower into vacuum streams of vacuum gas oil and vacuum tower bottoms comprising vacuum resid oil;

(n) conveying and feeding a substantial portion of said vacuum tower bottoms from said resid vacuum tower to a multistage solvent extraction unit;

(o) feeding a solvent to said multistage solvent extraction unit, said solvent comprising a member selected from the group consisting of butane and pentane and mixtures thereof.

19. A hydrotreating process comprising the steps of:
(a) feeding a first stream comprising resid to a reactor of a resid hydrotreating unit;

(b) feeding a second stream comprising recycled substantially deasphalted resins to said reactor;
(c) feeding hydrotreating catalyst to said reactor;
(d) injecting hydrogen-rich gases into said reactor;
(e) hydrotreating in said reactor said first and second streams of steps (a) and (b), with said hydrogen-rich gases in the presence of said hydrotreating catalyst under hydrotreating conditions to produce hydrotreated oil;
(f) forwarding a virgin low sulfur resid feed to a first solvent extraction unit, mixing a hydrotreated output feed from step (e) with a solvent and feeding the resulting mixture to a first solvent separator stage, mixing an output from said first separator stage with said low sulfur resid feed and feeding the resulting mixture to a second solvent separator stage, recycling a separated stream of resins from said second stage separator to join the feed of step (b) to the reactors, feeding a top level output from said second separator stage to a third solvent separator stage, withdrawing deasphalted oil from an output of said third separator stage, and forwarding a deasphalted oil output from said third separator stage for further processing;
(g) fractionating said hydrotreated oil in at least one fractionator selected from the group consisting of an atmospheric tower and a vacuum tower to produce gas oil and resid bottoms;
(h) substantially separating said resid bottoms into one stream comprising asphaltenes and said second stream comprising said substantially deasphalted resins; and
(i) recycling said second stream comprising said recycled deasphalted resins to said reactor of step (b).

* * * * *

UNITED STATES PATENT AND TRADEMARK OFFICE
CERTIFICATE OF CORRECTION

PATENT NO.   : 5,228,978
DATED        : July 20, 1993
INVENTOR(S)  : James L. Taylor, et al It is certified that error appears in the above-indentified patent and that said Letters Patent is hereby corrected as shown below:

```
Column 17, lines 49-50:
"hydrogen heater inlet line 19" should read --
hydrogen heater inlet line 194--.

Column 20, line 16,
"for use as and third" should read --for use as
quench gases.  The quench gases are injected
into the second and third--.
```

Signed and Sealed this

Twenty-first Day of June, 1994

Attest:

BRUCE LEHMAN

Attesting Officer        Commissioner of Patents and Trademarks